United States Patent
Lee et al.

(10) Patent No.: US 12,254,118 B2
(45) Date of Patent: Mar. 18, 2025

(54) ELECTRONIC DEVICE FOR PERFORMING EDGE COMPUTING SERVICE, AND OPERATING METHOD OF ELECTRONIC DEVICE

(71) Applicant: Samsung Electronics Co., Ltd., Suwon-si (KR)

(72) Inventors: Wonbo Lee, Suwon-si (KR); Jinhyoung Kim, Suwon-si (KR); Taewan Kim, Suwon-si (KR); Hongshik Kim, Suwon-si (KR); Ansik Shin, Suwon-si (KR); Sangcheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 17/986,497

(22) Filed: Nov. 14, 2022

(65) Prior Publication Data

US 2023/0100148 A1    Mar. 30, 2023

Related U.S. Application Data

(63) Continuation of application No. PCT/KR2021/002091, filed on Feb. 19, 2021.

(30) Foreign Application Priority Data

May 25, 2020    (KR) .......................... 10-2020-0062594

(51) Int. Cl.
*H04L 29/06*    (2006.01)
*G06F 21/60*    (2013.01)
(Continued)

(52) U.S. Cl.
CPC ........ *G06F 21/6281* (2013.01); *G06F 21/602* (2013.01); *G06F 21/64* (2013.01)

(58) Field of Classification Search
None
See application file for complete search history.

(56) References Cited

U.S. PATENT DOCUMENTS 8,285,732 B2 * 10/2012 Danninger ..... G06Q 10/063112
 707/706
8,955,082 B2 * 2/2015 Mazur ................. H04L 63/0846
 726/8

(Continued)

FOREIGN PATENT DOCUMENTS

EP    3 462 316 A1    4/2019
JP    2018-534651 A    11/2018

(Continued)

OTHER PUBLICATIONS

3rd Generation Partnership Project; Technical Specification Group Services and System Aspects; Architecture for enabling Edge Applications; (Release 17), 3GPP TS 23.558 V0.1.1, Jan. 2020, Sophia Antipolis, France.

(Continued)

*Primary Examiner* — Maung T Lwin
(74) *Attorney, Agent, or Firm* — Jefferson IP Law, LLP

(57) ABSTRACT

An electronic device and an operating method of an electronic device are provided. The electronic device receives, from a first server, access information about a second server for accessing the second server, receives access information about a third server from the second server accessed based on the access information about the second server, in response to a service connection request using the third server of an application, checks the validity of the application based on data for verifying the validity of the application included in the access information about the third server, and performs the service by accessing the third server based on the result of identifying the validity of the application.

18 Claims, 12 Drawing Sheets

(51) Int. Cl.
*G06F 21/62* (2013.01)
*G06F 21/64* (2013.01)

(56) References Cited

U.S. PATENT DOCUMENTS

| | | | |
|---|---|---|---|
| 9,401,895 | B2 | 7/2016 | Herberg et al. |
| 10,007,513 | B2 | 6/2018 | Malladi et al. |
| 10,341,868 | B2 | 7/2019 | Ross et al. |
| 10,382,206 | B2 | 8/2019 | Muhanna et al. |
| 10,567,495 | B2 | 2/2020 | Gandhi et al. |
| 10,757,089 | B1* | 8/2020 | Hohler ............... H04L 63/0807 |
| 10,846,694 | B2* | 11/2020 | Wong ................. H04W 12/069 |
| 10,887,198 | B2 | 1/2021 | Giust et al. |
| 10,945,108 | B2 | 3/2021 | Rasmusson et al. |
| 11,019,491 | B2 | 5/2021 | Lee et al. |
| 11,128,482 | B2 | 9/2021 | Asanghanwa et al. |
| 11,153,777 | B2 | 10/2021 | Heo et al. |
| 11,304,037 | B2 | 4/2022 | Fechtel et al. |
| 11,381,382 | B2 | 7/2022 | Kim et al. |
| 2009/0271847 | A1* | 10/2009 | Karjala ............... H04L 63/0807 726/6 |
| 2010/0318782 | A1 | 12/2010 | Auradkar et al. |
| 2012/0089481 | A1* | 4/2012 | Iozzia ..................... H04N 7/16 726/5 |
| 2013/0191882 | A1* | 7/2013 | Jolfaei ................. G06F 21/335 726/4 |
| 2017/0230187 | A1 | 8/2017 | Li et al. |
| 2018/0262339 | A1* | 9/2018 | Kazin ..................... H04L 9/14 |
| 2019/0069177 | A1* | 2/2019 | Engan .................. G06F 21/42 |
| 2019/0140919 | A1 | 5/2019 | Smith et al. |
| 2019/0356743 | A1 | 11/2019 | Park et al. |
| 2020/0320717 | A1 | 10/2020 | Ha et al. |
| 2020/0389531 | A1 | 12/2020 | Lee et al. |
| 2021/0352090 | A1 | 11/2021 | Kim et al. |

FOREIGN PATENT DOCUMENTS

| | | |
|---|---|---|
| JP | 6443196 B2 | 12/2018 |
| JP | 2020-502853 A | 1/2020 |
| JP | 2020-526944 A | 8/2020 |
| JP | 2021-135918 A | 9/2021 |
| JP | 7042439 B2 | 3/2022 |
| KR | 10-2018-0119162 A | 11/2018 |
| KR | 10-2018-0119651 A | 11/2018 |
| KR | 10-2019-0132018 A | 11/2019 |
| KR | 10-2020-0004146 A | 1/2020 |
| KR | 10-2020-0007754 A | 1/2020 |
| KR | 10-2020-0033092 A | 3/2020 |
| KR | 10-2020-0117260 A | 10/2020 |
| KR | 10-2020-0130106 A | 11/2020 |
| KR | 10-2020-0131830 A | 11/2020 |
| KR | 10-2021-0132928 A | 11/2021 |
| WO | 2018/093638 A1 | 5/2018 |

OTHER PUBLICATIONS

Extended European Search Report dated Sep. 21, 2023, issued in European Patent Application No. 21812760.3.

\* cited by examiner

FIG. 3
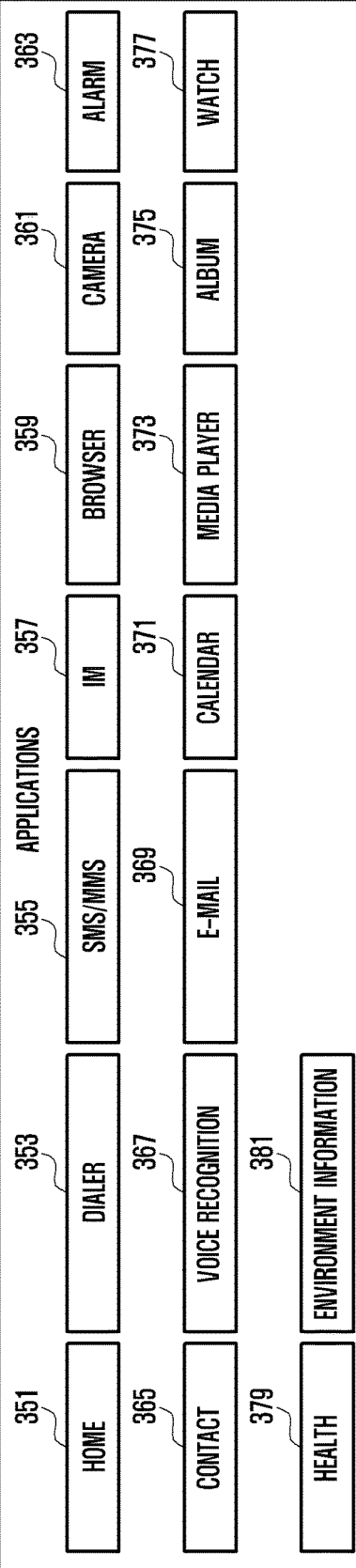
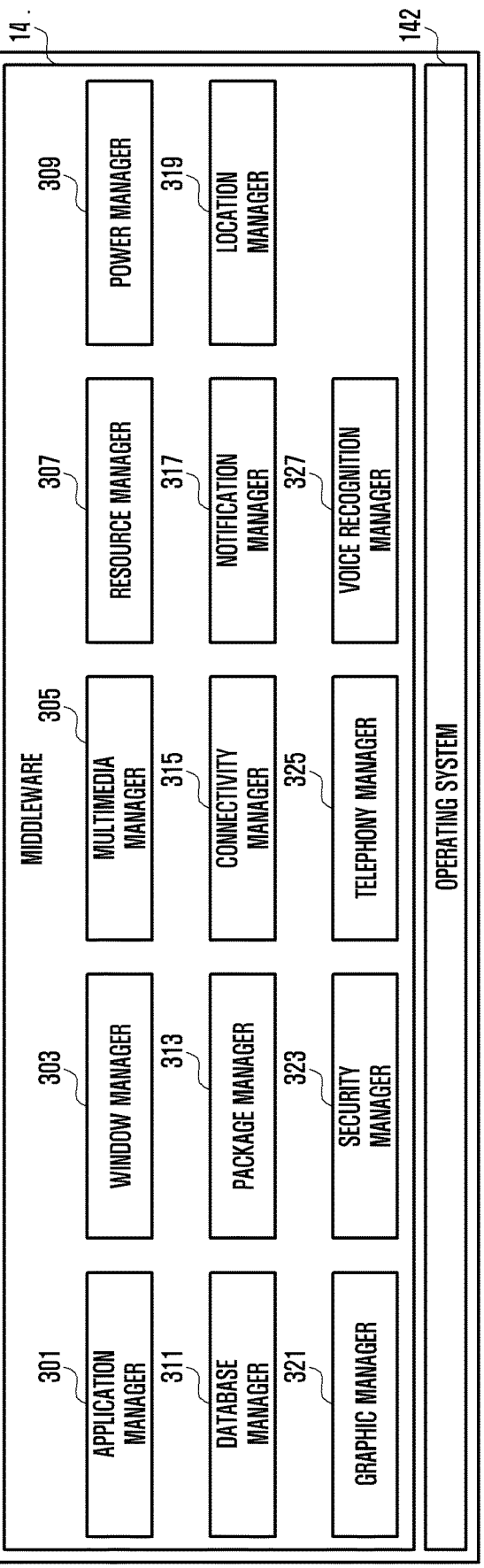

ELECTRONIC DEVICE FOR PERFORMING EDGE COMPUTING SERVICE, AND OPERATING METHOD OF ELECTRONIC DEVICE

CROSS-REFERENCE TO RELATED APPLICATION(S)

This application is a continuation application, claiming priority under § 365 (c), of an International application No. PCT/KR2021/002091, filed on Feb. 19, 2021, which is based on and claims the benefit of a Korean patent application number 10-2020-0062594, filed on May 25, 2020, in the Korean Intellectual Property Office, the disclosure of which is incorporated by reference herein in its entirety.

BACKGROUND

1. Field

The disclosure relates to an electronic device and an operating method of the electronic device. More particularly, the disclosure relates to an electronic device that performs an edge computing service.

2. Description of Related Art

With the popularization of various electronic devices, such as a smartphone, a tablet personal computer (tablet PC), a portable multimedia player (PMP), a personal digital assistant (PDA), a laptop personal computer (laptop PC), and a wearable device, various wireless communication technologies using various electronic devices to perform communication have been developed.

To meet the demand for wireless data traffic having increased since deployment of $4^{th}$ generation (4G) communication systems, efforts have been made to develop a $5^{th}$ generation (5G) communication system. Therefore, the 5G communication system is also called a "beyond 4G network" communication system or a "post long term evolution (LTE)" system. The 5G communication system is considered to be implemented in higher frequency bands (e.g., 60 GHz bands), in addition to $6^{th}$ generation (6G) or less frequency bands, so as to accomplish higher data rates. Beamforming, massive multiple-input multiple-output (massive MIMO), full dimensional MIMO (FD-MIMO), array antenna, analog beam forming, large scale antenna techniques have been discussed in the 5G communication system.

In the 5G communication system, various techniques are being proposed and implemented in order to implement a reduction in transmission time or a reduction in latency. Among the implemented techniques, an edge computing service indicates a technology in which an edge network system is implemented in an area close to a base station and in which an electronic device connected to the base station may receive various services using the edge network system implemented in the area close to the base station. The edge computing service is able to reduce the distance between the user's electronic device and the network, thereby providing a high-speed service due to the reduced distance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of performing an edge computing service that detect a request for connection of an edge computing service from a specific application and receive information about a server capable of performing the edge computing service from an edge data network. The electronic device may perform a connection with the edge data network, based on the information about the server.

The information about the server may include identification information of an application capable of using the edge computing service. The electronic device may identify whether or not the identification information of the application matches the identification information of the application requesting connection for the edge computing service and provide the edge computing service.

The identification information of the application is implemented as a name of an application with relatively low reliability. Accordingly, if the application requesting connection for the edge computing service has the same name as a valid application but is an invalid application, the electronic device may fail to prevent the invalid application from performing the edge computing service.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store data related to an application, the application, and/or an edge enabler client (EEC), a communication circuit configured to be used for communication connections between the electronic device and a first server, a second server, and/or a third server, which are located outside the electronic device, through a base station, and at least one processor, wherein the application may be configured to perform one or more functions corresponding to an application, which is executable in the third server, in the electronic device, and wherein the at least one processor may be configured to receive access information of the third server from the first server and/or the second server, identify, in response to a request for connection of a service using the third server from the application stored in the memory, validity of the application, based on data for verifying the validity of the application included in the access information of the third server and the data related to the application, and access the third server and perform the service, based on a result of identifying the validity of the application.

In accordance with another aspect of the disclosure, an operating method of an electronic device is provided. The operating method includes receiving access information of a second server for accessing the second server from a first server, receiving access information of a third server from the second server accessed based on the access information of the second server, identifying, in response to a request for connection of a service using the third server from an application, validity of the application, based on data for verifying the validity of the application included in the access information of the third server, and accessing the third server to perform the service, based on a result of identifying the validity of the application.

The electronic device and the operating method of the electronic device according to various embodiments of the disclosure may verify validity of an application requesting connection for an edge computing service and provide an edge computing service, based on the verification result. Accordingly, the electronic device and the operating method of the electronic device may provide an edge computing service with improved security.

The electronic device and the operating method of the electronic device according to various embodiments of the disclosure, when verifying validity of an application requesting connection for an edge computing service, may verify the validity of the application using hash data of the application, which is high security information, and provide an edge computing service, based on the verification result. Accordingly, the electronic device and the operating method of the electronic device may provide an edge computing service with improved security.

The electronic device and the operating method of the electronic device according to various embodiments of the disclosure, when verifying validity of an application requesting connection for an edge computing service, may verify the validity of the application using signature data obtained by encrypting hash data of the application, which is high security information, and provide an edge computing service, based on the verification result. Accordingly, the electronic device and the operating method of the electronic device may provide an edge computing service with improved security.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a block diagram illustrating programs according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
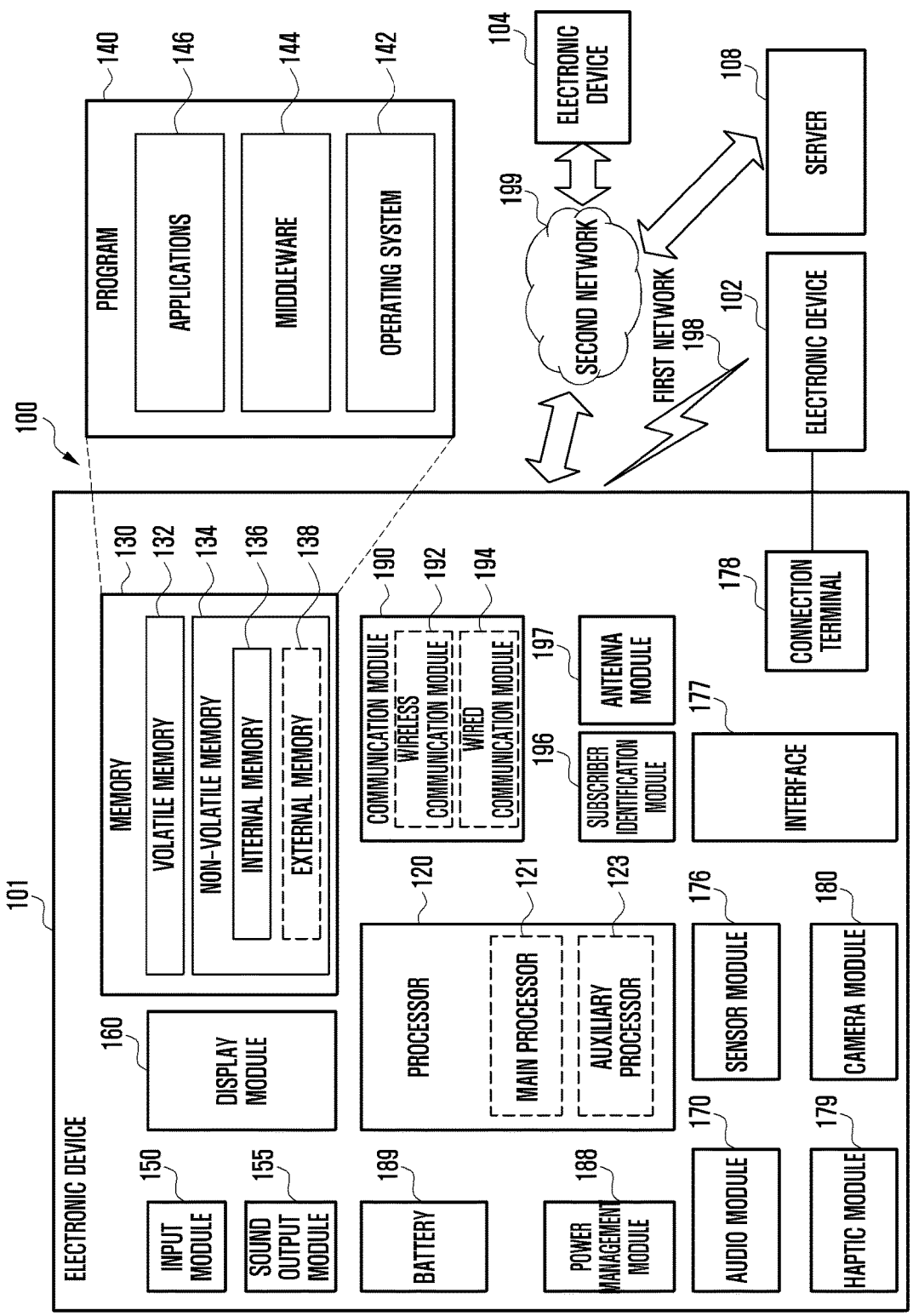
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
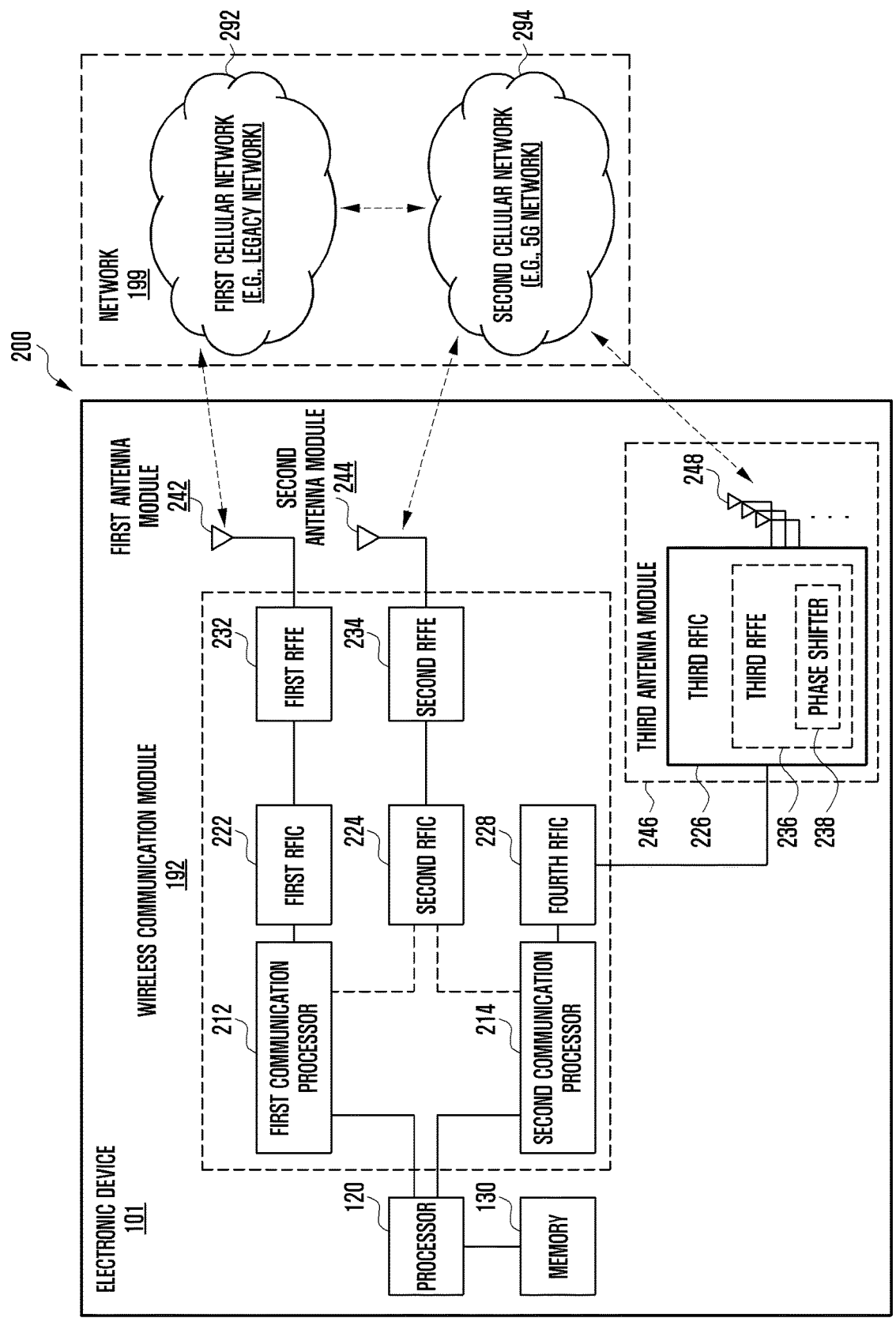
FIG. 2 is a block diagram of an electronic device according to an embodiment of the disclosure.

FIG. 2 is a block diagram 200 of an electronic device 101 for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first network 292 and a second network 294. According to another embodiment of the disclosure, the electronic device 101 may further include at least one component among the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment of the disclosure, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments of the disclosure, the first network may be a legacy network including $2^{nd}$ generation (2G), $3^{rd}$ generation (3G), $4^{th}$ generation (4G), or long term evolution (LTE) network. The second communication processor 214 may establish a communication channel corresponding to a designated band (e.g., approximately 6 GHz to 60 GHZ) among bands to be used for wireless communication with the second network 294, and may support 5G network communication via the established channel. According to certain embodiments of the disclosure, the second network 294 may be a 5G network defined in $3^{rd}$ generation partnership project (3GPP). Additionally, according to an embodiment of the disclosure, the first communication processor 212 or the second communication processor 214 may establish a communication channel corresponding to another designated band (e.g., lower than 6 GHZ) among bands to be used for wireless communication with the second network 294, and may support 5G network communication via the established channel. According to an embodiment of the disclosure, the first communication processor 212 and the second communication processor 214 may be implemented in a single chip or a single package. According to certain embodiments of the disclosure, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment of the disclosure, the third RFFE 236 may be implemented as a part of the third RFIC 226.

According to an embodiment of the disclosure, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment of the disclosure, the first RFIC 222 and the second RFIC 224 may be implemented as a single chip or at least a part of the single package. According to an embodiment of the disclosure, the first RFFE 232 and the second RFFE 234 may be implemented as a single chip or at least a part of the single package. According to an embodiment of the disclosure, at least one antenna module of the first antenna module 242 or the second antenna module 244 may be omitted, or may be combined with another antenna module so as to process RF signals in a plurality of bands.

According to an embodiment of the disclosure, the third RFIC 226 and the antenna 248 may be disposed in the same substrate, and may form a third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment of the disclosure, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

FIG. 3 is a block diagram 300 illustrating the program 140 according to an embodiment of the disclosure.

Referring to FIG. 3, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the external electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment of the disclosure, the power manager 309 may interwork with a basic input/output system (BIOS) (not shown) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device 101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment of the disclosure, the middleware 344 may dynamically delete some existing components or add new components. According to an embodiment of the disclosure, at least part of the middleware 144 may be included as part of the OS 142 or may be implemented as another software separate from the OS 142.

The application 146 may include, for example, a home 351, a dialer 353, a short message service (SMS)/multimedia messaging service (MMS) 355, an instant message (IM) 357, a browser 359, a camera 361, an alarm 363, a contact 365, a voice recognition 367, an email 369, a calendar 371, a media player 373, an album 375, a watch 377, health 379 (e.g., for measuring the degree of workout or biometric information, such as blood sugar), or environmental information 381 (e.g., for measuring air pressure, humidity, or temperature information) application. According to an embodiment of the disclosure, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 4:
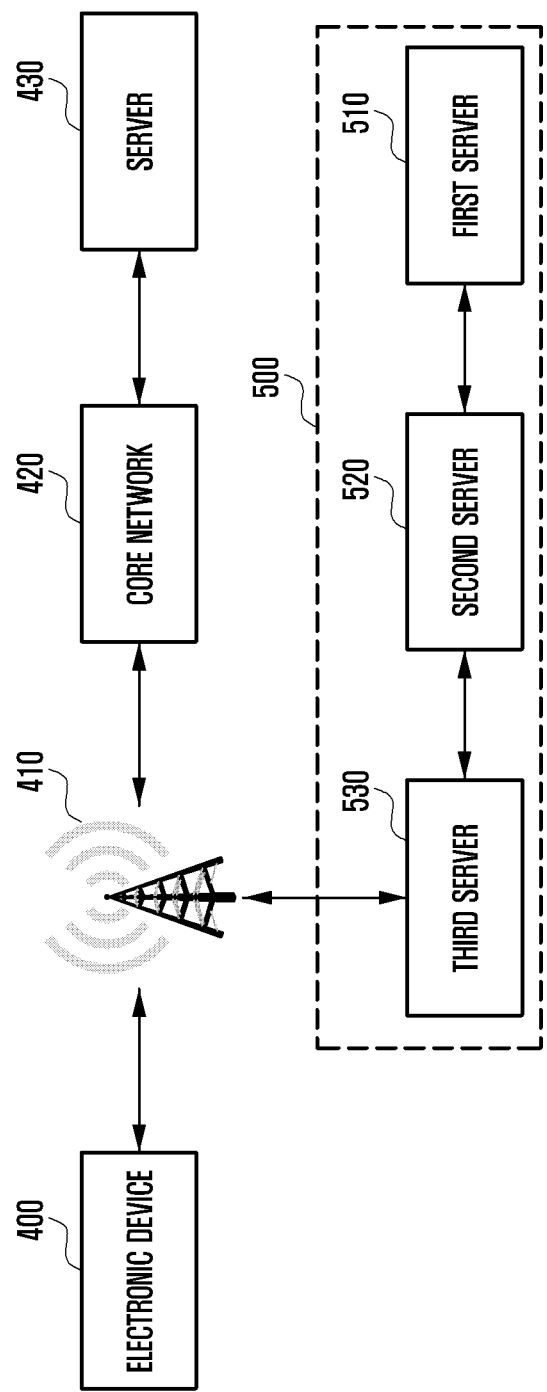
FIG. 4 is a block diagram illustrating a network system according to an embodiment of the disclosure.

FIG. 4 is a block diagram illustrating a network system according to an embodiment of the disclosure.

FIG. 4 illustrates a network system for an electronic device 400 to use an edge network system.

Referring to FIG. 4, according to various embodiments of the disclosure, a network system may include an electronic device (e.g., the electronic device 101 in FIG. 1) 400, a base station 410, a core network 420, a server 430, and/or an edge network system 500.

The electronic device 400 according to various embodiments of the disclosure may receive data provided by the server 430 or transmit data to the server 430 through the base station 410 and the core network 420. The server 430 may be a server provided in the outside (e.g., the Internet network) of a network (e.g., a network including the base station 410 and the core network 420) operated by a cellular communication service provider. According to an embodiment of the disclosure, the operating entity of the server 430 may be a different operator from the cellular communication operator.

In various embodiments of the disclosure, the electronic device 400 may transmit or receive control data or user data to or from the base station 410 while performing cellular communication. The cellular communication may indicate any one of various cellular communication schemes supported by the electronic device 400. For example, the cellular communication may be any one of cellular communication (e.g., long-term evolution (LTE), LTE-advanced (LTE-A), or LTE-Advance pro (LTE-A provide)) through a first network (e.g., the first network 192 in FIG. 1), or cellular communication (e.g., 5G on below 6 GHz or 5G on above 6 GHz) through a second network (e.g., the second network 194 in FIG. 1).

According to various embodiments of the disclosure, the base station 410 may be wirelessly connected to the electronic device 400 and may be connected to the core network 420 and/or the edge network 500 through wired or wireless communication, thereby establishing paths for data transmission or reception between the electronic device 400 and the core network 420 and/or the edge network 500. The base station 410 may transmit control data or user data transmitted by the core network 420 and/or the edge network 500 to the electronic device 400. The base station 410 may transmit control data or user data transmitted by the electronic device 400 to the core network 420 and/or the edge network 500. The control data may indicate data for controlling various operations through cellular communication of the electronic device 400. The user data may indicate IP data transmitted through cellular communication of the electronic device 400. For example, the base station 410 may be defined as an evolved Node B (eNB) (or eNodeB) in the 4G mobile communication scheme and as a next-generation node B (gNB) (or gNodeB) in the 5G mobile communication scheme.

According to various embodiments of the disclosure, the core network 420 may perform various functions (e.g., call connection, internet protocol (IP) data processing, authentication of the electronic device 400, billing processing of a cellular communication service used by the electronic device 400, mobility management of the electronic device 400, or connection of the electronic device 400 with an external network) using cellular communication used by the electronic device 400. The core network 420 may be defined as an evolved packet core (EPC) in the $4^{th}$ generation mobile communication scheme and as a 5 generation core (5GC) in the $5^{th}$ generation mobile communication scheme.

According to various embodiments of the disclosure, the core network 420 supporting 5G mobile communication may support various functions (e.g., edge computing), compared to a core network supporting 4G mobile communication. Edge computing may indicate a technology for performing various services through the edge network system 500 implemented in a location physically close to the electronic device 400 (e.g., a location physically close to the base station 410 or inside the base station 410) in order to implement a high communication speed or low latency. Since the edge network system 500 is able to be implemented in a location physically close to the electronic device 400, compared to the server 430, data communication through the edge network system 500 is able to implement a higher communication speed and/or lower latency than data communication through the core network 420. For example, the edge network system 500 may be directly connected to the core network 420 or may be provided in a location physically close thereto or inside the core network 420.

According to various embodiments of the disclosure, a first server 510 may be a server that provides information about at least one or more second servers 520 to which the electronic device 400 is able to connect. For example, information about the second server 520 may include access information of the second server 520 (e.g., access address information of the second server 520 including an IP address of the second server 520, a domain address of the second server 520, and/or a uniform resource identifier (URI) of the second server 520 and identification information of the second server 520). The first server 510 may be an element the same as or similar to an edge data network configuration server (ECS) defined in TS 23.558.

According to various embodiments of the disclosure, the second server 520 may be a server connected to a third server 530 and manage various operations of the third server 530. The second server 520 may receive performance information of the third server 530 (e.g., available resources (e.g., memory capacity or bandwidth) of the third server 530) from the third server 530. The second server 520 may transmit information about at least one or more third servers 530 connected to the second server 520 in response to a request from the electronic device 400. The second server 520 may be an element the same as or similar to the edge enabler server (EES) defined in TS 23.558.

Figure 5:
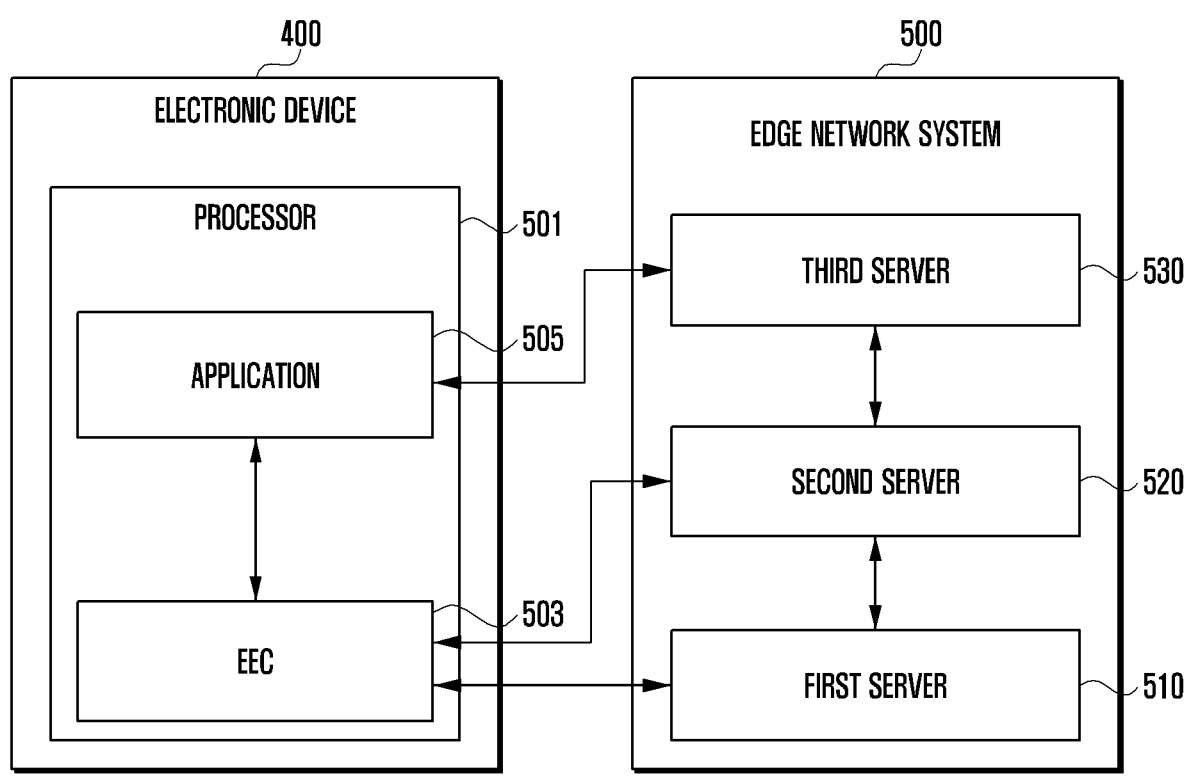
FIG. 5 is a diagram illustrating an electronic device and an edge network according to an embodiment of the disclosure.

According to various embodiments of the disclosure, the third server 530 may be a server that provides an edge computing service available to an application 501 installed in the electronic device 400. The third server 530 may provide application data related to the edge computing service to the application 501. The third server 530 may be an element the same as or similar to the edge application server (EAS) defined in TS 23.558. Although one third server 530 is illustrated in FIG. 5, a plurality of third servers 530 may be provided depending on a service provided. At least one or more third servers 530 may be deployed in various locations within the mobile communication network to provide edge services to user equipment (UE) in a close location.

According to various embodiments of the disclosure, for connection with the edge network system 500, the electronic device 400 may transmit a signal requesting access to the first server 510 to the core network 420. The core network 420 may transmit access information of the first server 510 to the electronic device 400 through various procedures (e.g., an authentication operation of the electronic device 400).

In various embodiments of the disclosure, although all of the first server 510, the second server 520, and the third server 530 included in the edge network system 500 are illustrated to be disposed near the base station 410 (or near the electronic device 400) for convenience of explanation, they are not limited thereto and may be disposed in various locations. For example, the first server 510 and the second server 520 may be connected or disposed adjacent to the core network (e.g., the core network 420 in FIG. 4), and the third server 530 may be disposed at a location close to the electronic device 400 (e.g., connected to or adjacent to the base station 410). As another example, the first server 510 and the second server 520 may be disposed in the outside (e.g., the Internet network) of a mobile communication network (e.g., a network including the base station 410 and the core network 420) operated by a cellular communication operator, and the third server 530 may be disposed at a location close to the electronic device 400. Alternatively, the first server 510 and the second server 520 may be implemented as one integrated entity. It will be readily understood by those skilled in the art that the elements included in the edge network system 500 may have various arrangements in the case where the edge network system 500 according to various embodiments includes at least one third server 530 that is disposed closer to the electronic device 400 than to the external server 430 and capable of providing an edge service.

Various embodiments of a connection operation between the electronic device 400 and the edge network system 500 will be described later with reference to FIG. 5.

FIG. 5 is a diagram illustrating an electronic device and an edge network system according to an embodiment of the disclosure.

Referring to FIG. 5, according to various embodiments of the disclosure, the edge network system 500 may include a first server 510, a second server 520, and/or a third server 530.

According to various embodiments of the disclosure, the third server 530 may be a server that provides an edge computing service available to an application 501 installed in the electronic device 400. The third server 530 may provide application data related to the edge computing service to the application 501. The third server 530 may be an element the same as or similar to the edge application server (EAS) defined in TS 23.558.

According to various embodiments of the disclosure, the second server 520 may be a server connected to the third server 530 and manage various operations of the third server 530. The second server 520 may receive performance information of the third server 530 (e.g., available resources (e.g., memory capacity or bandwidth) of the third server 530) from the third server 530. The second server 520 may transmit information about at least one or more third servers 530 connected to the second server 520 in response to a request from the electronic device 400. The second server 520 may be an element the same as or similar to the edge enabler server (EES) defined in TS 23.558.

According to various embodiments of the disclosure, the first server 510 may be a server that provides information about at least one or more second servers 520 to which the electronic device 400 is able to connect. For example, information about the second server 520 may include access information of the second server 520 (e.g., access address information of the second server 520 including an IP address of the second server 520, a domain address of the second server 520, and/or a uniform resource identifier (URI) of the second server 520 and identification information of the second server 520). The first server 510 may be an element the same as or similar to an edge data network configuration server (ECS) defined in TS 23.558.

According to various embodiments of the disclosure, the electronic device 400 may include a processor (e.g., the processor 120 in FIG. 1) 501 and a memory (e.g., the memory 130 in FIG. 1). The memory 130 may store various program modules executable by the processor 120. The memory 130 may store an application (e.g., the application 146 in FIG. 1) 505 capable of performing a service using an edge network and various elements (e.g., an edge enabler client (EEC) 503) for supporting edge computing. The processor 501 may load and execute (or operate) various program modules (e.g., the EEC 503 and the application 505) stored in the memory 130. The EEC 503 may be implemented on an application layer (e.g., the application 146 in FIG. 1), middleware (e.g., the middleware 144 in FIG. 1), and/or an operating system (e.g., the operating system 142 in FIG. 1).

According to various embodiments of the disclosure, the EEC 503 may identify an application 505 capable of using an edge computing service from among various applications being executed (or operated) in the electronic device 400 and perform various operations configured such that the application 505 may transmit or receive data of the application 505 to or from the third server 530.

The EEC 503 may receive access information of an element of the edge network system 500, enabling the application 505 to exchange application data through the edge network system 500, from the edge network system 500 and control a connection between the edge network system 500 and the electronic device 400, based on the access information. Hereinafter, a specific embodiment for a connection between the EEC 503 and the third server 530 will be described.

According to various embodiments of the disclosure, the EEC 503 may perform, based on the access information of the first server 510 received from a core network (e.g., the core network 420 in FIG. 4), an operation of connection with the first server 510. In another embodiment of the disclosure, the EEC 503 may also perform an operation of connection with the first server 510, based on access information of the first server 510 stored in the electronic device (e.g., the memory 130 and/or a SIM card (e.g., the subscriber identification module 196 in FIG. 1)). The EEC 503 may transmit identification information of the electronic device 400 (e.g., an international mobile subscriber identify (IMSI) and/or a generic public subscription identifier (GPSI) of the electronic device 501) to the first server 510, and the first server 510 may perform authentication of the electronic device 400, based on the identification information of the electronic device 400.

According to various embodiments of the disclosure, after the connection with the first server 510 is completed, the EEC 503 may perform a provisioning procedure for an edge service. The provisioning procedure may include an operation of transmitting a signal requesting access information of the second server 520 to the first server 510. The first server 510 may transmit access information of the second server 520 (e.g., at least one piece of identification information of the second server 520, URI information of the second server 520, domain information of the second server 520, IP address information of the second server 520, and access point name (APN) information and/or data network name (DNN) information corresponding to a dedicated public data network (PDN) or packet data unit (PDU) when the edge network system 500 has a dedicated PDN or PDU session, and/or information (e.g., token) used for verification for valid connection of the second server 520) to the electronic device 400.

According to various embodiments of the disclosure, the access information of the second server 520 may be the same as or similar to the EES list defined in TS 23.558. For example, the access information of the second server 520 may be implemented as shown in Table 1 below and transmitted to the EEC 503. The access information of the second server 520 may include identification information of the second server 520 and/or access address information of the second server 520 (e.g., URI information of the second server 520, domain information of the second server 520, IP address information of the second server 520, or access point name (APN) information and/or data network name (DNN) information corresponding to a dedicated public data network (PDN) or packet data unit (PDU) when the edge network system 500 has a dedicated PDN or PDU session).

TABLE 1

| EES identification information | Access address information |
|---|---|
| EES 1 | ees1.edge1.com |
| EES 2 | ees2.edge2.com |

According to various embodiments of the disclosure, the EEC 503 may attempt to access the second server 520, based on the access information (e.g., EES identification information and access address information) of the second server 520 received from the first server 510. The second server 520 may identify whether or not the electronic device 400 has the authority to access the second server 520, based on the access information (e.g., token) of the second server 520 transmitted from the EEC 503, and determine whether or not to permit access (or connection) of the electronic device 400, based on the identification result. For example, the second server 520 may receive a token and determine whether or not to perform access (or connection) of the electronic device 400 to the second server 520 through an authentication operation with an authentication server (not shown) using the received token. In this case, the token may be information transmitted from the authentication server (not shown) to the electronic device 400.

According to various embodiments of the disclosure, the EEC 503 may perform an edge service discovery procedure (e.g., a procedure of searching for service information capable of being executed in the edge server(s)) in order to obtain information about the third server 530 that may provide an edge computing service to the application 505. The EEC 503 may transmit, to the second server 520, an edge service discovery request message requesting access information of at least one or more third servers 530 connected to the second server 520. The second server 520 may transmit an edge service discovery response message including access information of the third server 530 stored in the second server 520 to the EEC 503.

The access information of the third server 530 may include an identifier of the third server 530, an access address of the third server 530 (e.g., an IP address of the third server 530 or a domain address of the third server 530), and/or a service identifier providable from the third server 530.

According to various embodiments of the disclosure, the third server 530 may be a software entity implemented in units of services. For example, a plurality of third servers 530 may be entities implemented in one physical server and may be servers that provide different services. In this case, the access information of the third server 530 may include access information of applications executable in the third server 530 and/or identification information of applications that are installed in the electronic device 400 and capable of performing services using the third server 530.

According to various embodiments of the disclosure, the access information of the third server 530 may be the same as or similar to the EAS list defined in TS 23.558. Information of the third server 530 may be implemented as shown in Table 2 below and transmitted to the EEC 503.

TABLE 2

| EAS identification information | Application identification information (ACID) | Access address information |
|---|---|---|
| EAS1 | com.android.app1 | ees1.edge1.com |
| EAS2 | com.android.app2 | 2.2.2.2 |
| EAS3 | com.android.app3 | ees3.edge3.com/3.3.3.3 |

The access information of the second server 530 included in Table 2 may include access information of service applications (EAS identification information) that are executable in the third server 530 and/or identification information of applications (ACID) executed in the electronic device 400. For example, each row in Table 2 (e.g., EAS1, EAS2, EAS3, or the like) may indicate identification information and access addresses of a first server application and a second server application that are executable in the third server 530.

According to various embodiments of the disclosure, in response to reception of the service connection request using the third server 530 from the application 505, the EEC 503 may retrieve a third server 530 capable of providing a service available to the application 505 from the access information of the third server 530. The EEC 503 may identify application identification information (e.g., com.android.app1) that matches application identification information (e.g., com.android.app1) to be used by the application 505 from among the application identification information (e.g., com.android.app1 and com.android.app2) included in the identification information of the third server 530 and transmit a domain address (e.g., app1.edge.com) or an IP address (e.g., 3.3.3.1) of the third server 530 corresponding to the identified application identification information (e.g., com.android.app1) to the application 505. The application 505 may perform connection to the third server 530, based on the received domain address or IP address of the third server 530, and perform a service using the third server 530.

Although FIG. 5 shows that the processor 501 and/or the application 505 is directly connected to the edge network system 500, the processor 501 and/or the application 505 may exchange data with the edge network system 500 using elements (e.g., the wireless communication module 192 in FIG. 1) for communication of the electronic device 101.

According to various embodiments of the disclosure, the EEC 503 may identify application identification information included in the access information of the third server and, based on the access information of the third server 530 corresponding to the application identification information matching the identification information of the application having transmitted the service connection request using the third server 530, perform access to the third server 530. However, according to a comparative example for comparison with the embodiments of the disclosure, if the application 505 has the same name as an application produced by a malicious third party, the EEC 503 may fail to prevent the invalid application from performing a service using the third server 530.

Hereinafter, specific embodiments of preventing an invalid application from performing a service using the third server 530 will be described with reference to FIGS. 6 to 10.

Figure 6:
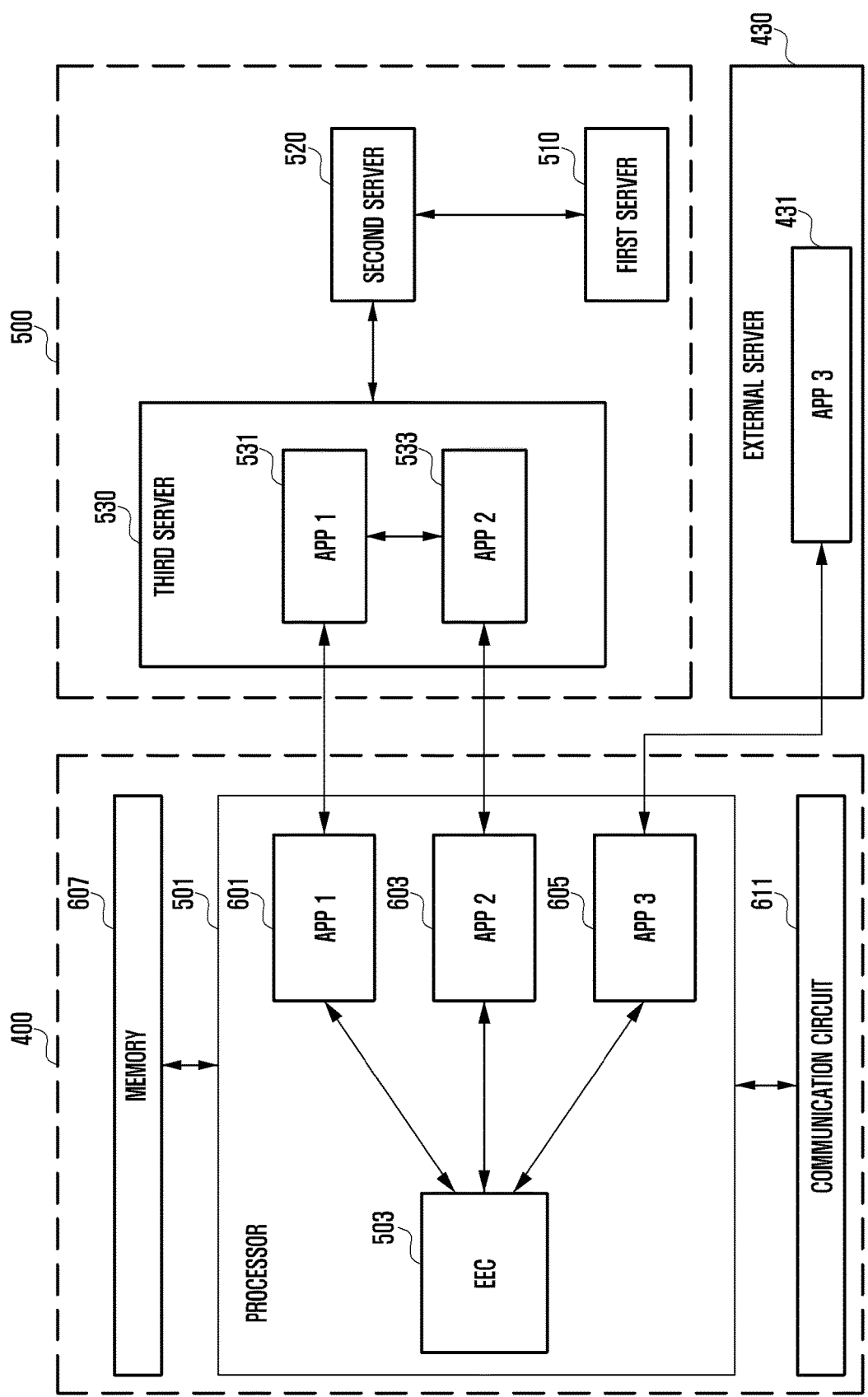
FIG. 6 is a diagram illustrating an embodiment in which an electronic device performs a service using a third server, based on validity verification of an application, according to an embodiment of the disclosure.

FIG. 6 is a diagram illustrating an embodiment in which an electronic device performs a service using a third server, based on validity verification of an application, according to an embodiment of the disclosure.

Referring to FIG. 6, an electronic device 400 according to various embodiments of the disclosure may include a memory (e.g., the memory 130 in FIG. 1) 607 capable of storing at least one or more applications (e.g., the application 146 in FIGS. 3) 601, 603, and 605 and data related to the applications 601, 603, and 605, a processor (e.g., the processor 120 in FIG. 1) 501, and/or a communication circuit 611.

According to various embodiments of the disclosure, the memory 130 may store various program modules executable by the processor 120. The memory 130 may store applications (e.g., the application 505 in FIGS. 5) 601, 603, and 605 capable of performing a service using an edge network and various elements (e.g., the edge enabler client (EEC) 503) for supporting edge computing. The processor 501 may read and execute (or operate) various program modules (e.g., the EEC 503 and the applications 601, 603, and 605) stored in the memory 130. The EEC 503 may be implemented on an application layer (e.g., the application 146 in FIG. 1), middleware (e.g., the middleware 144 in FIG. 1), and/or an operating system (e.g., the operating system 142 in FIG. 1).

According to various embodiments of the disclosure, at least one or more applications 601, 603, and 605 may be programs installed and executable in the electronic device 400. For convenience of description, it is assumed that, among the at least one or more applications 601, 603, and 605, a first application 601 and a second application 603 are permitted to perform a service using the third server 530 and that a third application 605 is not permitted to perform a service using the third server 530. The first application 601 may execute one or more functions in the electronic device 400, which are provided by an application 531 that is executable in the third server 530. The second application 603 may execute one or more functions (or services) in the electronic device 400, which are provided by the application 533 that is executable in the third server 530. The third application 605 may execute one or more functions in the electronic device 400, which are provided by an application 431 that is executable in an external server 430. The applications 601, 603, and 605 executed in the electronic device 400 may be service client applications, and the applications 531, 533, and 431 executed in servers (e.g., the third server 530 or the external server 431) may be service server applications. For example, the first application 531 may be a first server application corresponding to EAS1 in Table 2, and the second application 533 may be a second server application corresponding to EAS2 in Table 2. Although FIG. 6 shows that the first application 531 and the second application 533 are implemented in the same server (e.g., the third server 530), the third server where the first application 531 and the second application 533 operate may be implemented as physical servers that are physically and/or geographically different from each other. According to various embodiments of the disclosure, the memory 607 may store data related to the applications 601, 603, and 605. The data related to the applications 601, 603, and 605 may include at least one or more of installation data used for installation of the applications 601, 603, and 605, first hash data produced by inputting at least part of binary data of the installation data of the applications 601, 603, and 605 into a function implemented by a specified algorithm (e.g., secure hast algorithm (SHA) 1, SHA256, or message-digest algorithm (MD) 5), first signature data obtained by encrypting the first hash data in various ways (e.g., symmetric key cryptography or public key cryptography), information indicating an algorithm used to produce the first hash data, or a decryption key used to decrypt the encrypted data.

According to various embodiments of the disclosure, the value of the first hash data may be different between the respective applications. Since the first signature data is produced by encrypting the first hash data, it may have different values between the respective applications. Although the first hash data may be data produced by inputting binary data of the installation data into a hash function implemented in various ways, it may be data produced using a specified algorithm implemented to disable recovery of data related to the application, instead of a hash algorithm.

According to various embodiments of the disclosure, the communication circuit 611 may transmit (or receive) data transmitted from the applications 601, 603, and 605 to (or from) the edge network system 500 or an external server (e.g., the external server 430 in FIG. 4) through cellular communication. The communication circuit 611 may establish and manage a plurality of channels including a first channel for transmitting or receiving data to or from the third server 530 and/or a second channel for transmitting or receiving data to or from the external server 430. The communication circuit 611, under the control of the EEC 503, may transmit data transmitted by the EEC 503 or receive data from the third server 530 or the external server 430 using any one of the first channel and the second channel. The first channel may indicate a dedicated network channel between an application whose validity has been verified (e.g., the first application 601 and/or the second application 603) and the third server 530. The second channel may indicate a network channel between an application whose validity has failed to be verified (e.g., the third application 605) and the external server 430. For example, the communication circuit 611 may transmit edge data 613 transmitted by the first application 601 and/or the second application 603 to the third server 530 through the first channel under the control of the processor 501. As another example, the communication circuit 611 may transmit edge data 613 transmitted by the third application 605 to the external server 430 through the second channel under the control of the processor 501.

According to various embodiments of the disclosure, the EEC 503 may perform various operations for identifying applications 601 and 603 capable of using an edge computing service from among the various applications installed in the electronic device 400 and transmitting data of the applications 601 and 603 (e.g., IP data packets of the first application 531 or the second application 533) to the third server 530 or transmitting data transmitted from the third server 530 (e.g., IP data packets of the applications 531 and 533 running in the third server 530) to the application 505.

According to various embodiments of the disclosure, the EEC 503 may attempt to access the second server 520, based on access information of the second server 520 received from the first server 510. The second server 520 may identify whether or not the electronic device 400 has the authority to access the second server 520, based on the access information of the second server 520 transmitted from the EEC 503, and determine whether or not to permit connection of the electronic device 400, based on the identification result.

According to various embodiments of the disclosure, the EEC 503 may perform an edge service discovery procedure in order to obtain information about the third server 530 capable of providing an edge computing service to the applications 601 and 603. The EEC 503 may transmit, to the second server 520, an edge service discovery request message requesting access information of at least one or more third servers 530 connected to the second server 520. The access information of the third server 530 may include access information of the applications 531 and 533 that provide services available to the applications 601 and 603. The second server 520 may transmit an edge service discovery response message including access information of the third server 530 stored in the second server 520 to the EEC 503. The access information of the third server 530 may include an identifier of the third server 530 and information for accessing the applications 531 and 533 installed in the third server 530. The information for accessing the applications 531 and 533 installed in the third server 530 may include address information (e.g., URI information, IP address and/or domain address) or a service identifier (EAS ID) for accessing services using the applications 531 and 533.

According to various embodiments of the disclosure, the access information of the third server 530 may include data for verifying validity of an application. Verifying the validity of the applications 601, 603, and 605 may indicate an operation of identifying whether or not the applications are allowed to perform a service using the third server 530.

According to various embodiments of the disclosure, the data for verifying the validity of an application may indicate data that may be used for verifying the validity of the applications 601, 603, and 605. The data for verifying the validity of applications may include at least one or more of second hash data produced by inputting binary data of the installation data of the applications 601, 603, and 605 into a function implemented by a specified algorithm (e.g., SHA1, SHA256, or MD5), second signature data obtained by encrypting the second hash data in various ways (e.g., symmetric key cryptography or public key cryptography), a decryption key used to decrypt encrypted data, certificates of the applications 601, 603, and 605, and hash data of the certificates. The certificates may indicate data that is issued through a third certification authority of the applications 601, 603, and 605 and indicates that the applications 601, 603, and 605 are valid.

According to various embodiments of the disclosure, the access information of the third server 530 may be implemented as shown in Table 3 below so as to include data for verifying the validity of the applications 601, 603, and 605 and transmitted to the EEC 503.

TABLE 3

| EAS identification information | Application identification information | Data for verifying validity of application | Access address information |
|---|---|---|---|
| EAS1 | com.android.app1 | signature 1 | app1.edge.com/3.3.3.1 |
| EAS2 | com.android.app2 | signature 2 | app2.edge.com/Eas2.edge.com |

According to another embodiment of the disclosure, the EEC 503 may transmit an edge service discovery request message including information (EAS) indicating specific applications 531 and 533 installed in the third server 530 and/or information (ACID) indicating specific applications 601 and 603 installed in the electronic device 400 to the second server 530.

In response to identifying that the edge service discovery request message includes information indicating the specific applications 531 and 533 installed in the third server 530, the second server 530 may transmit an edge service discovery response message including access information of the third server 530 in which data for verifying the validity of the applications is input to an EAS identification information field. The access information of the third server 530 may be implemented as shown in Table 4 below. The access information of the third server 530 implemented as shown in Table 4 may include data for verifying the validity of the applications 601, 603, and 605 in a field where EAS identification information is input and have a smaller data size than the access information of the third server 530 shown in Table 3. The EEC 503 may receive the edge service discovery response message including the access information of the third server 530 from the second server 520 and, in response to identifying that the EAS identification information included in the access information of the third server 530 is different from the EAS identification information included in the edge service discovery request message, use the data in the EAS identification information field of the access information of the third server 530 as data for verifying the validity of the applications 601, 603, and 605.

TABLE 4

| EAS identification information | Application identification information | Access address information |
|---|---|---|
| signature 1 | com.android.app1 | app1.edge.com/3.3.3.1 |
| signature 2 | com.android.app2 | app2.edge.com/Eas2.edge.com |

According to another embodiment of the disclosure, the EEC 503 may transmit, to the third server 530, an edge service discovery request message including information (EAS) indicating the specific applications 531 and 533 installed in the third server 530. The third server 530, in response to identifying that the edge service discovery request message includes information indicating the specific applications 531 and 533 installed in the third server 530, may transmit an edge service discovery response message including access information of the third server 530 in which data for verifying the validity of an application is input to an application identification field. The access information of the third server 530 may be implemented as shown in Table 5 below. The access information of the third server 530 implemented as shown in Table 5 may include data for verifying the validity of the applications 601, 603, and 605 in a field where the application identification information is input and have a smaller data size than the access information of the third server 530 shown in Table 3. The EEC 503 may receive the edge service discovery response message including the access information of the third server 530 and, in response to identifying that the application identification information included in the access information of the third server 530 is different from the application identification information included in the edge service discovery request message, use the data in the application identification information of the access information of the third server 530 as data for verifying the validity of the applications 601, 603, and 605.

TABLE 5

| EAS identification information | Application identification information | Access address information |
|---|---|---|
| EAS1 | Signature1 | appl.edge.com/3.3.3.1 |

According to various embodiments of the disclosure, the second server 520 may produce access information of the third server 530 by a combination of data included in various fields (e.g., EAS identification information, application identification information, or access address information) included in the access information of the third server 530 and data for verifying the validity of an application. For example, the second server 520 may produce access information of the third server 530 by combining data included in the EAS identification information field and data for verifying the validity of an application, and transmit an edge service discovery response message including the access information of the third server 530 to the EEC 503. The EEC 503 may extract data for verifying the validity of an application included in the edge service discovery response message.

According to various embodiments of the disclosure, the EEC 503 may verify the validity of the applications 601, 603, and 605 requesting execution of a service, based on the data for verifying the validity of the applications 601, 603, and 605 included in the access information of the third server 530.

According to various embodiments of the disclosure, the EEC 503 may identify whether or not the first signature data included in the application-related data stored in the memory 607 matches the second signature data included in the data for verifying the validity of the applications 601, 603, and 605. If the applications 601, 603, and 605 installed in the electronic device 400 include valid applications 601 and 603, the first signature data may match the second signature data. If the application 605 installed in the electronic device 400 is not valid (e.g., if the third application 605 has only the same name as the first application 601, the third application 605 may not be valid), the first signature data may not match the second signature data.

According to various embodiments of the disclosure, in response to identifying that the first signature data matches the second signature data, the EEC 503 may identify that the applications 601 and 603 requesting execution of a service are valid applications. In response to identifying that the first signature data does not match the second signature data, the EEC 503 may identify that the application 605 requesting execution of a service is an invalid application.

According to various embodiments of the disclosure, the EEC 503 may identify whether or not the first hash data included in the application-related data stored in the memory 607 matches the second hash data included in the data for verifying the validity of the applications 601, 603, and 605. If the applications 601, 603, and 605 installed in the electronic device 400 include valid applications 601 and 603, the first hash data may match the second hash data. If the application 605 installed in the electronic device 400 is not valid (e.g., if the third application 605 has only the same name as the first application 601, the third application 605 may not be valid), the first hash data may not match the second hash data.

According to various embodiments of the disclosure, the EEC 503 may produce the second hash data using the second signature data and the decryption key included in the data for verifying the validity of the applications 601, 603, and 605. The EEC 503 may identify whether or not the first hash data included in the application-related data stored in the memory 607 matches the second hash data.

According to various embodiments of the disclosure, the EEC 503 may also receive a decryption key for decrypting the second signature data from the first server 510. The EEC 503 may produce the second hash data using the second signature data included in the data for verifying the validity of the applications 601, 603, and 605 and the decryption key received from the first server 510. The EEC 503 may identify whether or not the first hash data included in the application-related data stored in the memory 607 matches the second hash data.

According to various embodiments of the disclosure, the EEC 503 may decrypt the first signature data included in the data related to the applications 601, 603, and 605 using the decryption key included in the data for verifying the validity of the applications 601, 603, and 605. The EEC 503 may identify whether or not a decryption value of the first signature data matches the first hash data.

According to various embodiments of the disclosure, in response to identifying that the first hash data matches the second hash data, the EEC 503 may identify that the applications 601 and 603 requesting execution of a service are valid applications. In response to identifying that the first hash data does not match the second hash data, the EEC 503 may identify that the application 605 requesting execution of a service is an invalid application. According to various embodiments of the disclosure, the EEC 503 may verify the validity of the applications 601, 603, and 605 requesting execution of a service using certificates of the applications 601, 603, and 605 included in the data for verifying the validity of the applications 601, 603, and 605. The EEC 503 may compare certificates of the applications 601, 603, 605 included in the data for verifying the validity with certificates of the applications 601, 603, 605 stored in the memory 607, thereby identifying the validity of the applications 601, 603, and 605.

According to various embodiments of the disclosure, the EEC 503 may verify the validity of the applications 601, 603, and 605 requesting execution of a service using hash data of the certificates of the applications 601, 603, and 605 included in the data for verifying the validity of the applications 601, 603, and 605. The EEC 503 may compare hash data of the certificates of the applications 601, 603, 605 included in the data for verifying the validity with hash data of the certificates of the applications 601, 603, and 605 stored in the memory 607, thereby identifying the validity of the applications 601, 603, and 605.

According to various embodiments of the disclosure, the EEC 503 may access the third server 530, based on the result of identifying the validity of the applications 601, 603, and 605, and perform a service.

According to various embodiments of the disclosure, the EEC 503, in response to identifying that the applications 601 and 603 are valid, may access the third server 530 and perform a service. The processor 501 may control communication circuit 611 such that the applications 601 and 603 may transmit edge data 613 to the third server 530 or receive data transmitted from the third server 530.

According to various embodiments of the disclosure, in response to identifying that the application 605 is not valid, the EEC 503 may block the operation of accessing the third server 530 to perform a service. The processor 501 may control the communication circuit 611 such that the application 605 may transmit general data 615 to the external server 430 or receive data transmitted from the external server 430.

According to various embodiments of the disclosure, the EEC 503, in response to identifying that the invalid application 605 requests execution of a service using the third server 530, may also perform various operations for blocking the use of wireless communication using the invalid application 605. The EEC 503 may control other elements (e.g., the display module 160, the sound output device 155, or the haptic module 179 in FIG. 1) of the electronic device 400 to output a message indicating the invalid application 605. The EEC 503 may also delete the invalid application 605.

In order to use a service using the third server 530, the electronic device 400 according to various embodiments of the disclosure may verify the validity of the applications 601, 603, and 605, based on the data for verifying the validity of the applications 601, 603, and 605, as well as the identification information of the applications 601, 603, and 605 (e.g., names of the applications). The electronic device 400 may provide a service using the third server 530 to valid applications 601 and 603, thereby improving security.

Figure 7:
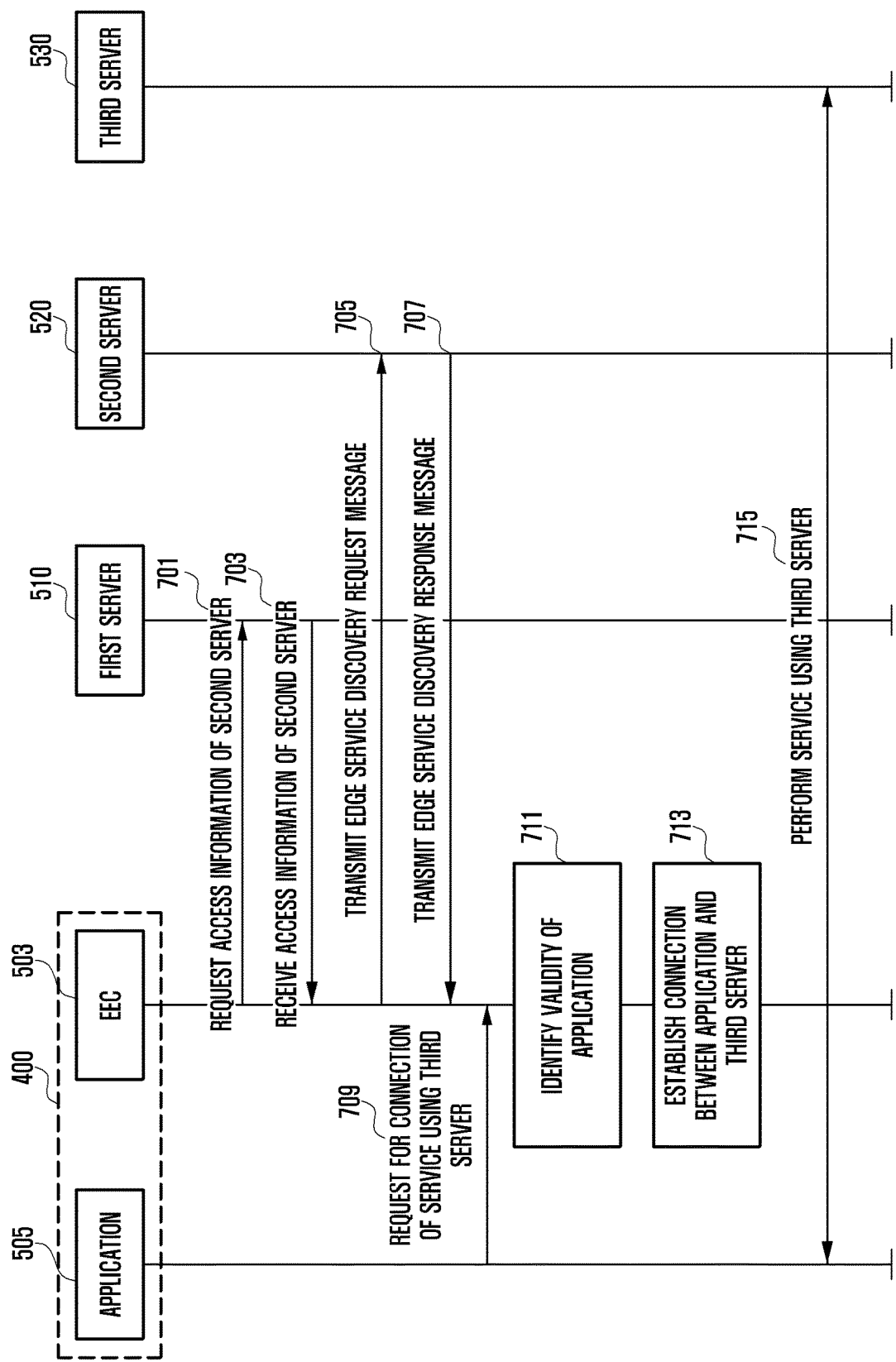
FIG. 7 is a flowchart illustrating an operation in which an electronic device performs a service using a third server, based on validity verification of an application, according to an embodiment of the disclosure.

FIG. 7 is a flowchart illustrating an operation in which an electronic device performs a service using a third server, based on validity verification of an application, according to an embodiment of the disclosure.

Referring to FIG. 7, according to various embodiments of the disclosure, an EEC (e.g., the edge enabler client 503 in FIG. 5) of an electronic device (e.g., the electronic device 400 in FIG. 4) may transmit a signal requesting access information of a second server (e.g., the second server 520 in FIG. 5) to a first server (e.g., the first server 510 in FIG. 5) in operation 701.

According to various embodiments of the disclosure, in operation 703, the first server 510, in response to reception of the request for access information of the second server 520, may transmit access information of the second server 520 connected to the first server 510.

According to various embodiments of the disclosure, the access information of the second server 520 may include identification information of the second server 520 and/or access address information of the second server 520. The access address information of the second server 520 may include at least one piece of IP address information of the second server 520, domain information of the second server 520, or URI information of the second server 520.

According to various embodiments of the disclosure, in operation 705, the EEC 503 may transmit an edge service discovery request message for requesting access information of the third server 530, based on the access information of the second server 520, to the second server 520. The edge service discovery request message may include identification information of the EEC 503, token information for authenticating the authority to access the second server 520, and/or information indicating a search condition of the third server 530 connected to the second server 520 (e.g., information indicating a specific service or a specific third server 530).

According to various embodiments of the disclosure, in operation 707, the second server 520, in response to reception of the edge service discovery request message, may transmit, to the EEC 503, an edge service discovery response message including access information of the third server 530 connected to the second server 520.

According to various embodiments of the disclosure, the access information of the third server 530 may include data for verifying validity of an application (e.g., the first application 601, the second application 603, or the third application 605 in FIG. 6). Verifying the validity of the applications 601, 603, and 605 may indicate an operation of identifying whether or not the applications are allowed to perform a service using the third server 530.

According to various embodiments of the disclosure, the data for verifying the validity of an application may indicate data that may be used for verifying the validity of the applications 601, 603, and 605. The data for verifying the validity of applications may include at least one or more of second hash data produced by inputting binary data of installation data of the applications 601, 603, and 605 into a function implemented by a specified algorithm (e.g., SHA1, SHA256, or MD5), second signature data obtained by encrypting the second hash data in a specified method (e.g., symmetric key cryptography or public key cryptography), a decryption key used to decrypt encrypted data, certificates of the applications 601, 603, and 605, and hash data of the certificates. The certificates may indicate data that is issued through a third certification authority of the applications 601, 603, and 605 and indicates that the applications 601, 603, and 605 are valid.

According to various embodiments of the disclosure, in operation 709, the EEC 503 may receive a request for connection of a service using the third server 530 from the applications 601, 603, and 605. If the applications 601, 603, and 605 switches from an inactive state to an active state or if the applications 601, 603, and 605 switches from a background state to a foreground state, the applications 601, 603, and 605 may transmit a request for connection of a service using the third server 530 to the EEC 503.

According to various embodiments of the disclosure, although not shown, operation 709 may precede operation 705. In the case where operation 709 precedes operation 705, the EEC 503 may transmit an edge service discovery request message including information (EAS) indicating specific applications 531 and 533 installed in the third server 530 to the second server 520 in operation 705. In operation 707, the second server 520, in response to identifying that the edge service discovery request message includes information indicating specific applications 531 and 533 installed in the third server 530, may transmit an edge service discovery response message including access information of the third server 530 in which data for verifying the validity of the applications is input to an EAS identification information field. The EEC 503 may receive the edge service discovery response message including the access information of the third server 530 from the second server 520 and, in response to identifying that EAS identification information included in the access information of the third server 530 is different from EAS identification information included in the edge service discovery request message, use the data in the EAS identification information field of the access information of the third server 530 as data for verifying the validity of the applications 601, 603, and 605.

According to various embodiments of the disclosure, the EEC 503 may identify the validity of the applications in operation 711.

According to various embodiments of the disclosure, the EEC 503 may verify the validity of the applications 601, 603, and 605 requesting execution of a service, based on the data for verifying the validity of the applications 601, 603, and 605 included in the access information of the third server 530.

According to various embodiments of the disclosure, the EEC 503 may identify whether or not first signature data included in the application-related data stored in the memory 607 matches second signature data included in the data for verifying the validity of the applications 601, 603, and 605. If the applications 601, 603, and 605 installed in the electronic device 400 include valid applications 601 and 603, the first signature data may match the second signature data. If the application 605 installed in the electronic device 400 is not valid (e.g., if the third application 605 has only the same name as the first application 601, the third application 605 may not be valid), the first signature data may not match the second signature data.

According to various embodiments of the disclosure, in response to identifying that the first signature data matches the second signature data, the EEC 503 may identify that the applications 601 and 603 requesting execution of a service are valid applications. In response to identifying that the first signature data does not match the second signature data, the EEC 503 may identify that the application 605 requesting execution of a service is an invalid application.

According to various embodiments of the disclosure, the EEC 503 may identify whether or not first hash data included in the application-related data stored in the memory 607 matches second hash data included in the data for verifying the validity of the applications 601, 603, and 605. If the applications 601, 603, and 605 installed in the electronic device 400 include valid applications 601 and 603, the first hash data may match the second hash data. If the application 605 installed in the electronic device 400 is not valid (e.g., if the third application 605 has only the same name as the first application 601, the third application 605 may not be valid), the first hash data may not match the second hash data.

According to various embodiments of the disclosure, the EEC 503 may produce the second hash data using second signature data and a decryption key included in the data for verifying the validity of the applications 601, 603, and 605. The EEC 503 may identify whether or not the first hash data included in the application-related data stored in the memory 607 matches the second hash data.

According to various embodiments of the disclosure, the EEC 503 may also receive a decryption key for decrypting the second signature data from the first server 510. The EEC 503 may produce the second hash data using the second signature data included in the data for verifying the validity of the applications 601, 603, and 605 and the decryption key received from the first server 510. The EEC 503 may identify whether or not the first hash data included in the application-related data stored in the memory 607 matches the second hash data.

According to various embodiments of the disclosure, the EEC 503 may decrypt the first signature data included in the data related to the applications 601, 603, and 605 using the decryption key included in the data for verifying the validity of the applications 601, 603, and 605. The EEC 503 may identify whether or not a decryption value of the first signature data matches the first hash data.

According to various embodiments of the disclosure, in response to identifying that the first hash data matches the second hash data, the EEC 503 may identify that the applications 601 and 603 requesting execution of a service are valid applications. In response to identifying that the first hash data does not match the second hash data, the EEC 503 may identify that the application 605 requesting execution of a service is an invalid application.

According to various embodiments of the disclosure, the EEC 503 may verify the validity of the applications 601, 603, and 605 requesting execution of a service using certificates of the applications 601, 603, and 605 included in the data for verifying the validity of the applications 601, 603, and 605. The EEC 503 may compare certificates of the applications 601, 603, 605 included in the data for verifying the validity with certificates of the applications 601, 603, 605 stored in the memory 607, thereby identifying the validity of the applications 601, 603, and 605.

According to various embodiments of the disclosure, the EEC 503 may verify the validity of the applications 601, 603, and 605 requesting execution of a service using hash data of the certificates of the applications 601, 603, and 605 included in the data for verifying the validity of the applications 601, 603, and 605. The EEC 503 may compare hash data of the certificates of the applications 601, 603, 605 included in the data for verifying the validity with hash data of the certificates of the applications 601, 603, and 605 stored in the memory 607, thereby identifying the validity of the applications 601, 603, and 605.

According to various embodiments of the disclosure, the EEC 503 may access the third server 530, based on the result of identifying the validity of the applications 601, 603, and 605, and perform a service.

According to various embodiments of the disclosure, in operation 713, in response to identifying that the application 505 (e.g., 601 or 603) transmitting a request for execution of a service is a valid application, the EEC 503 may configure the application 505 (e.g., 601 or 603) to be connected to the third server 530, based on the access information of the third server 530 included in the edge service discovery response message.

According to various embodiments of the disclosure, in operation 713, the method in which the EEC 503 configures the application 505 (e.g., 601 or 603) to be connected to the third server 530 is a method of transmitting the access information of the third server 530 (e.g., access information (e.g., ip address) of server applications (e.g., 531 and 533)) to the application (e.g., the first application 601 or the second application 603), thereby establishing communication between the application and the applications (e.g., 531 and 533) of the third server. For example, the EEC 503 may transmit, to the application 505, a response message including access address information of the server applications (e.g., 531 and 533) (e.g., IP addresses of the server applications 531 and 533) in response to a domain name system (DNS) query request of the client application 505 (e.g., 601 or 603). The application 505 may configure communication with the applications (e.g., 531 and 533) of the third server 530, based on the access information of the server applications 531 and 533.

According to various embodiments of the disclosure, the electronic device 400 (or the processor 501) may configure a dedicated network channel for a connection between the application 505 and the third server 530. For example, the processor 501 may control the communication circuit 611 to produce a first channel that is a specified network interface (e.g., establish a PDU session dedicated to the application 505 or connect to a dedicated DNN gateway). The electronic device 400 (or the processor 501) may control the communication circuit 611 such that the applications 505 transmit or receive data through the specified network interface.

According to various embodiments of the disclosure, in operation 713, in response to identifying that the application 505 (e.g., 605) transmitting the request for execution of a service is an invalid application, the EEC 503 may not transmit the access information of the third server 530 to the application 505 (e.g., the third application 605). For example, the EEC 503 may not transmit the access information of the third server 530 to the application by dropping the access information request (e.g., DNS query) of the third application 605, transmitting a reply of an error message (e.g., DNS error) indicating that access to the third server 530 is impossible to the third application 605, or transmitting a reply of access information of the application 431 (e.g., IP address of the application 431) of the external server 403. According to various embodiments of the disclosure, in operation 715, the applications 601 and 603 may transmit or receive application data to or from the applications 531 and 533 of the third server 530 according to the access information of the third server 530 configured in operation 713, thereby performing a service using the third server 530.

Figure 8:
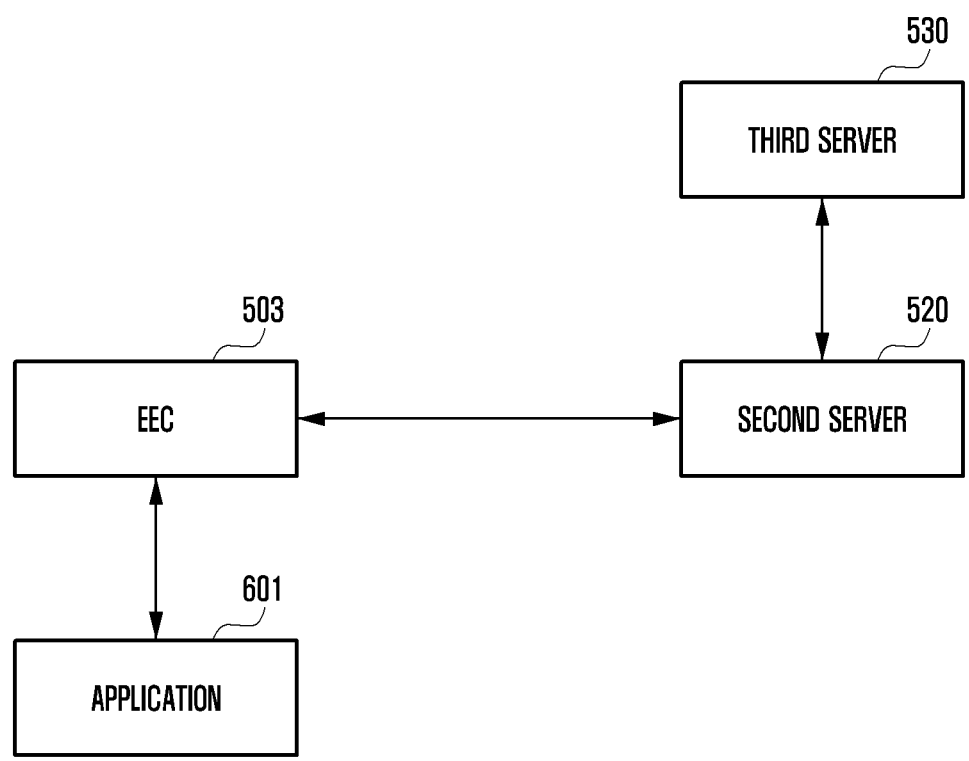
FIG. 8 is a diagram illustrating an embodiment in which an electronic device performs validity verification of an application according to an embodiment of the disclosure.

FIG. 8 is a diagram illustrating an embodiment in which an electronic device performs validity verification of an application according to an embodiment of the disclosure.

Referring to FIG. 8, according to various embodiments of the disclosure, the EEC 503 executed on a processor (e.g., the processor 501 in FIG. 5) of an electronic device (e.g., the electronic device 400 in FIG. 4) may verify validity of applications (e.g., the first application 601, the second application 603, and/or the third application 605 in FIG. 6) through various methods including comparison of hash data and comparison of signature data.

According to various embodiments of the disclosure, the third server 530 may store data for verification of the applications 601, 603, and 605. The third server 530 may store data for verification of the application 601 including second signature data, which is data obtained by encrypting the second hash data in a specified method (e.g., symmetric key cryptography or public key cryptography), and identification information of the application (e.g., the name of the application) and transmit the data for verification of the applications 601, 603, and 605 to the second server 520.

According to various embodiments of the disclosure, the second server 520 may produce the data for verification of the application 601 by itself, instead of receiving the data for verification of the applications 601, 603, and 605 from the third server 530. The second server 520 may also store the data for verification of the application 601 including the second signature data, which is data obtained by encrypting the second hash data in a specified method (e.g., symmetric key cryptography or public key cryptography), and identification information of the application (e.g., the name of the application).

According to various embodiments of the disclosure, the second server 520 may transmit an edge service discovery response message including the data for verification of the applications 601, 603, and 605 to the EEC 503.

According to various embodiments of the disclosure, the EEC 503 may decrypt the second signature data included in the data for verification of the applications 601, 603, and 605, based on a decryption key included in application-related data stored in a memory (e.g., the memory 607 in FIG. 6). The EEC 503 may identify whether or not the second hash data produced by decrypting the second signature data matches the first hash data included in the application-related data stored in the memory 607. The EEC 503 may verify the validity of the applications 601, 603, and 605, based on whether or not the first hash data matches the second hash data.

According to another embodiment of the disclosure, the third server 530 may store data for verification of the applications 601, 603, and 605 including second hash data produced by inputting binary data of the installation data of the applications 601, 603, and 605 into a function implemented by a specified algorithm (e.g., SHA1, SHA256, or MD5) and identification information of the applications 601, 603, and 605 (e.g., the names of the applications), and transmit the data for verification of the applications 601, 603, and 605 to the second server 520.

According to various embodiments of the disclosure, the second server 520 may transmit an edge service discovery response message including the data for verification of the applications 601, 603, and 605 to the EEC 503.

According to various embodiments of the disclosure, the EEC 503 may identify whether or not the first hash data included in the application-related data stored in the memory 607 matches the second hash data included in the data for verifying the validity of the applications 601, 603, and 605. If the applications 601, 603, and 605 installed in the electronic device 400 include valid applications 601 and 603, the first hash data may match the second hash data. If the application 605 installed in the electronic device 400 is not valid (e.g., if the third application 605 has only the same name as the first application 601, the third application 605 may not be valid), the first hash data may not match the second hash data.

According to another embodiment of the disclosure, the third server 530 may store data for verification of the application 601 including a decryption key used for decrypting the first signature data or the second signature data and identification information of the application (e.g., the name of the application), and may transmit the data for verification of the applications 601, 603, and 605 to the second server 520.

According to various embodiments of the disclosure, the second server verification of the applications 601, 603, and 605 to the EEC 503.

According to various embodiments of the disclosure, the EEC 503 may decrypt the first signature data included in the data related to the applications 601, 603, and 605 using the decryption key included in the data for verifying the validity of the applications 601, 603, and 605. The EEC 503 may identify whether or not a decryption value of the first signature data matches the first hash data.

According to various embodiments of the disclosure, in response to identifying that the first hash data matches the second hash data, the EEC 503 may identify that the application (e.g., the first application 601 or the second application 603) requesting execution of a service is a valid application. In response to identifying that the first hash data does not match the second hash data, the EEC 503 may identify that the application (e.g., the third application 605) requesting execution of a service is an invalid application.

Figure 9:
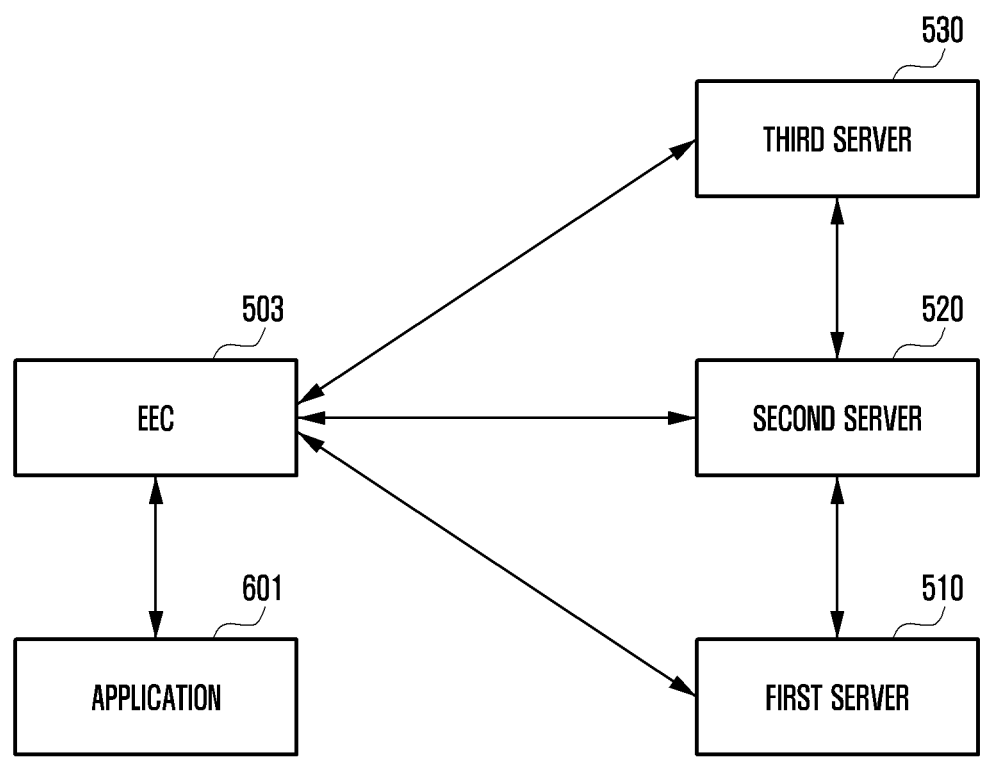
FIG. 9 is a diagram illustrating an embodiment in which an electronic device performs validity verification of an application using a decryption key received from a first server according to an embodiment of the disclosure.

FIG. 9 is a diagram illustrating an embodiment in which an electronic device performs validity verification of an application using a decryption key received from a first server according to an embodiment of the disclosure.

Referring to FIG. 9, according to various embodiments of the disclosure, a decryption key used to decrypt the first signature data and/or the second signature data may be stored in the second server 520 that transmits an edge service discovery response message and/or the first server 510 that performs a provisioning procedure for an edge service.

According to various embodiments of the disclosure, the EEC 503 may also receive the decryption key from the first server 510 in a provisioning procedure or other procedures for an edge service.

According to various embodiments of the disclosure, the second server 520 may transmit access information of the third server 530 to the EEC 503 through an edge service discovery procedure.

According to various embodiments of the disclosure, the access information of the third server 530 may include data for verifying the validity of the application. Verifying the validity of the applications 601, 603, and 605 may indicate an operation of identifying whether or not the applications (e.g., the first application 601 and/or the second application 603) are allowed to perform a service using the third server 530.

According to various embodiments of the disclosure, the data for verifying the validity of the applications 601, 603, and 605 may indicate data that may be used for verifying the validity of the application 601. The data for verifying the validity of applications may include at least one or more pieces of second hash data produced by inputting binary data of the installation data of the application 601 into a function implemented by a specified algorithm (e.g., SHA1, SHA256, or MD5).

According to various embodiments of the disclosure, the EEC 503 may produce the second hash data using the second signature data included in the data for verifying the validity of the application 601 and the decryption key received from the first server 510. The EEC 503 may identify whether or not the first hash data included in the application-related data stored in the memory 607 matches the second hash data and verify the validity of the application 601, based on the identification result.

Figure 10:
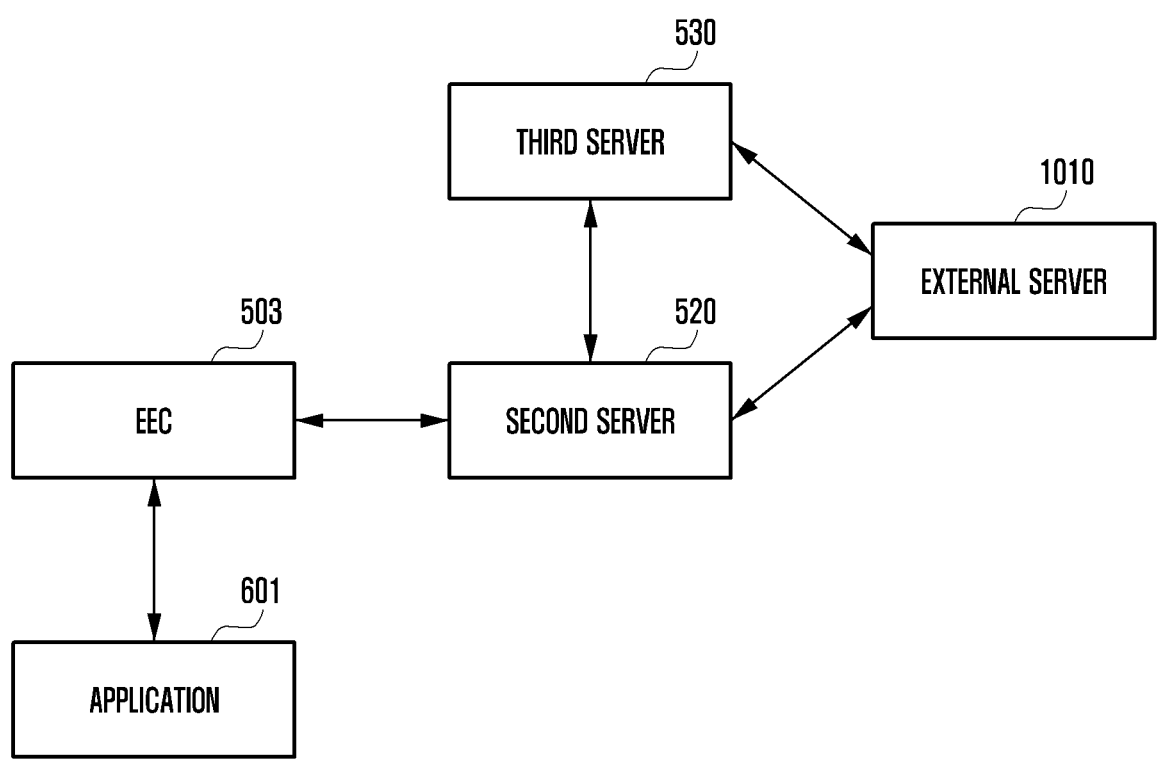
FIG. 10 is a diagram illustrating an embodiment in which an electronic device performs validity verification of an application using a decryption key produced by an external server managing a certificate according to an embodiment of the disclosure.

FIG. 10 is a diagram illustrating an embodiment in which an electronic device performs validity verification of an application using a decryption key produced by an external server managing a certificate according to an embodiment of the disclosure.

Referring to FIG. 10, according to various embodiments of the disclosure, the third server 530 or an external server 1010 may produce a certificate obtained by encrypting the second hash data, based on a private encryption key managed by the external server 1010.

According to various embodiments of the disclosure, the third server 530 may transmit the produced certificate to the second server 520. The second server 520 may store and manage at least one piece of data for verification of the application 601 including information about an algorithm of producing the second hash data, a certificate, a public key corresponding to a private encryption key, and second signature data corresponding to the second hash data.

According to various embodiments of the disclosure, the second server verification of the application 601 to the EEC 503 in response to the edge service discovery request message.

According to various embodiments of the disclosure, the EEC 503 may receive the data for verification of the application 601 and decrypt the certificate using a public key included in the data for verification of the application 601, thereby producing the second hash data. The EEC 503 may identify whether or not the first hash data included in the application-related data stored in the memory 607 matches the second hash data and verify the validity of the application 601, based on the identification result.

According to various embodiments of the disclosure, the third server 530 or the external server 1010 may produce a certificate obtained by encrypting the decryption key corresponding to the encryption key used to encrypt the second hash data, based on a private encryption key managed by the external server 1010.

According to various embodiments of the disclosure, the third server 530 may transmit the produced certificate to the second server 520. The second server 520 may store and manage data for verification of the application 601 including information about an algorithm of producing the second hash data, a certificate, a public key corresponding to a private encryption key, and second signature data corresponding to at least one piece of second hash data.

According to various embodiments of the disclosure, the second server 520 may transmit an edge service discovery response message including the data for verification of the application 601 to the EEC 503 in response to the edge service discovery request message.

According to various embodiments of the disclosure, the EEC 503 may verify the validity of the applications 601, 603, and 605 requesting execution of a service using the certificates of the applications 601, 603, and 605 included in the data for verifying the validity of the applications 601, 603, and 605. The EEC 503 may compare the certificates of the applications 601, 603, and 605 included in the data for verifying the validity with the certificates of the applications 601, 603, and 605 stored in the memory 607, thereby indicating the validity of the applications 601, 603, and 605.

According to various embodiments of the disclosure, the EEC 503 may receive the data for verification of the application 601 and decrypt the certificate using the public key included in the data for verification of the application 601, thereby producing a public key. The EEC 503 may decrypt the first signature data included in the application-related data stored in the memory 607 with the produced public key. The EEC 503 may identify whether or not a decryption value of the first signature data matches the first hash data included in the application-related data stored in the memory 607.

According to various embodiments of the disclosure, in response to identifying that the first hash data matches the second hash data, the EEC 503 may identify that the application 601 requesting execution of a service is a valid application. In response to identifying that the first hash data does not match the second hash data, the EEC 503 may identify that the application 601 requesting execution of a service is an invalid application.

Figure 11:
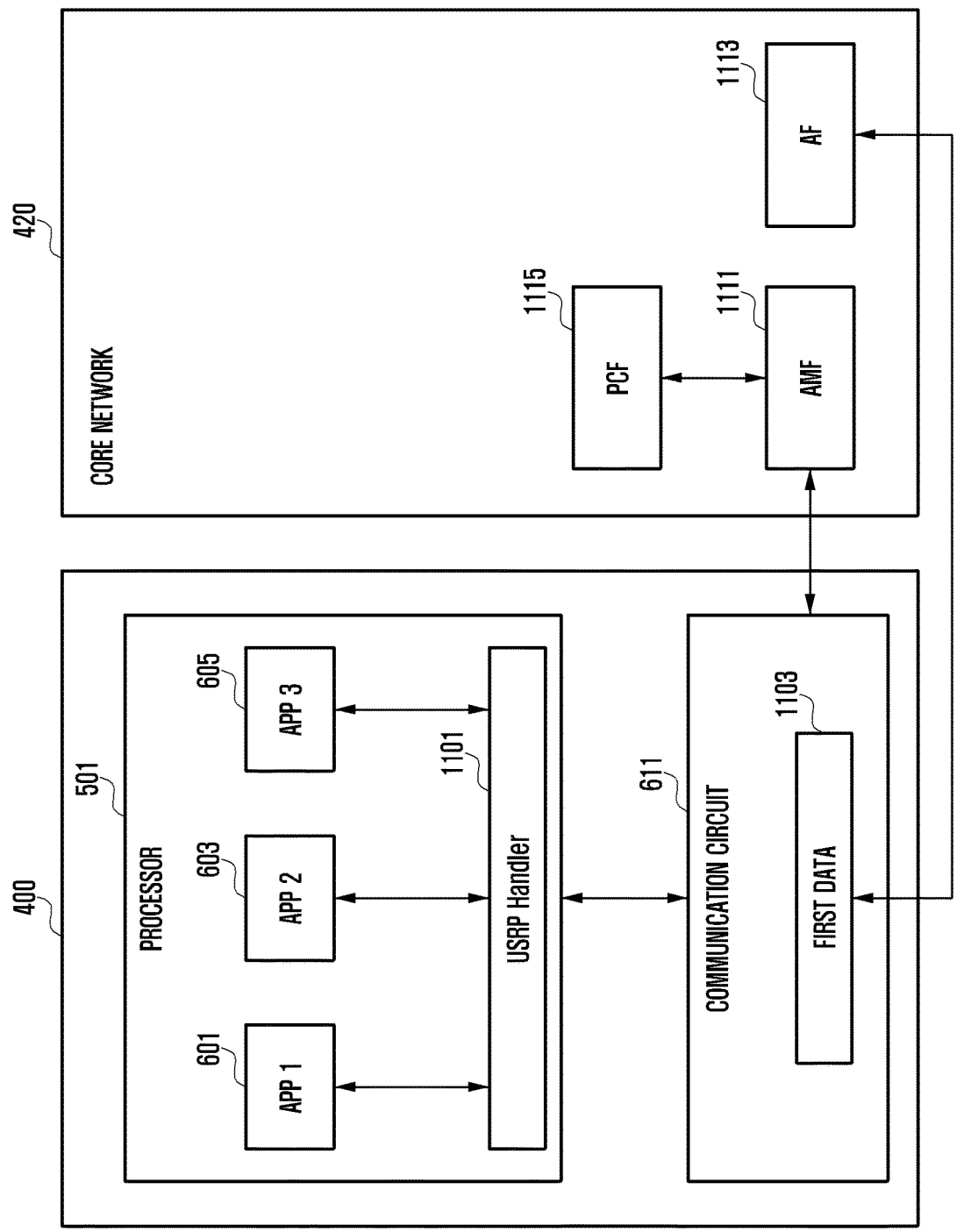
FIG. 11 is a diagram illustrating an embodiment in which an electronic device configures a data transmission path, based on a validity verification result of an application, according to an embodiment of the disclosure.

FIG. 11 is a diagram illustrating an embodiment in which an electronic device configures a data transmission path, based on a validity verification result of an application, according to an embodiment of the disclosure.

FIGS. 5 to 10 show the embodiments in which an electronic device (e.g., the electronic device 400 in FIG. 4) performs a service provided by an edge network system (e.g., the edge network system 500 in FIG. 4), based on a result of verifying the validity of an application. The electronic device 400 according to various embodiments of the disclosure may also perform a service (e.g., a service based on a policy of configuring a data traffic path for an application) provided by a core network (e.g., the core network 420 in FIG. 4), based on a result of verifying the validity of an application.

Referring to FIG. 11, the electronic device 400 according to various embodiments of the disclosure may include a memory 607 capable of storing at least one or more applications (e.g., the application 146 in FIGS. 3) 601, 603, and 605 and data related to and the applications 601, 603, and 605, a processor 501, and/or a communication circuit 611.

According to various embodiments of the disclosure, at least one or more applications 601, 603, and 605 may be programs capable of being installed in the electronic device 400. For convenience of description, it is assumed that, among the at least one or more applications 601, 603, and 605, a first application 601 and a second application 603 are permitted to perform a specific service and that a third application 605 is not permitted to perform a specific service.

According to various embodiments of the disclosure, a memory (e.g., the memory 130 in FIG. 1) may store data related to the applications 601, 603, and 605, and the applications 601, 603, and 605. The data related to the applications 601, 603, and 605 may include at least one or more of installation data used for installation of the applications 601, 603, and 605, first hash data produced by inputting binary data of the installation data of the applications 601, 603, and 605 into a function implemented by a specified algorithm (e.g., secure hast algorithm (SHA) 1, SHA256, or message-digest algorithm (MD) 5), first signature data obtained by encrypting the first hash data in various ways (e.g., symmetric key cryptography or public key cryptography), or a decryption key used to decrypt the encrypted data.

According to various embodiments of the disclosure, the communication circuit 611 may transmit (or receive) data transmitted by the applications 601, 603, and 605 to (or from) an external server (e.g., the external server 430 in FIG. 4) connected to the core network 420 through cellular communication. The communication circuit 611 may establish and manage a channel for transmitting or receiving first data 1103 to or from the external server 430. The communication circuit 611 may transmit or receive the first data 1103 under the control of a UE route selection policy (URSP) handler 1101.

According to various embodiments of the disclosure, the USRP handler 1101 may configure a transmission path or a reception path of the data of the applications 601, 603, and 605, based on information about a data transmission path transmitted from the core network 420.

According to various embodiments of the disclosure, the core network 420 may include various logically implemented elements. Various logically implemented elements may be distinguished based on functions, and the various elements may perform different functions from each other. The elements of the core network 420 illustrated in FIG. 11 are elements necessary for the description of FIG. 11, and the core network 420 may further include elements that are not illustrated in FIG. 11.

According to various embodiments of the disclosure, the core network 420 may include an access and mobility management function (AMF) 1111. The AMF 1111 may perform a registration procedure of the electronic device 400 on the cellular communication network, mobility management of the electronic device 400 (e.g., identifying the location of the electronic device 400), and management of a connection between the electronic device 400 and the cellular communication network.

According to various embodiments of the disclosure, the core network 420 may include an application function (AF) 1113. The AF 1113 may monitor a flow of packets including user data to ensure a specific quality and transmit information about the flow of packets to the policy control function (PCF) 1115.

According to various embodiments of the disclosure, the core network 420 may include a PCF 1115. The PCF 1115 may manage a policy of a cellular communication network provided by the core network 420. The PCF 1115 may determine a policy for session management or mobility management, based on information about the flow of packets provided by the AF 1113 and control the AMF 1111 to operate based on the determined session management policy or mobility management policy.

According to various embodiments of the disclosure, the PCF 1115 may transmit URSP information indicating a policy for specifying a transmission path (or reception path) of data exchanged between the electronic device 400 and the external server 430 to the USRP handler 1101 through the AMF 1111.

According to various embodiments of the disclosure, the USRP information may include information indicating that data related to a specific application (e.g., the first application 601) is to be transmitted through a specific data transmission path. The USRP handler 1101 may control the communication circuit 611, based on the USRP information, such that data related to a specific application (e.g., the first application 601) is transmitted to the external server 430 through a transmission path (e.g., channel) included in the USRP information.

According to various embodiments of the disclosure, the USRP information may include identification information of a specific application (e.g., the name of a specific application) and/or data for verifying the validity of the application. The USRP information may include compressed data or encrypted data produced based on the identification information of a specific application and/or the data for verifying the validity of the application. The compressed data or encrypted data may be used to verify the validity of the application, based on a decompression algorithm or a decryption key received through another path.

According to various embodiments of the disclosure, data for verifying the validity of an application may indicate data that may be used for verifying the validity of the applications 601, 603, and 605. The data for verifying the validity of the application may include at least one or more of second hash data produced by inputting binary data of the installation data of the applications 601, 603, and 605 into a function implemented by a specified algorithm (e.g., SHA1, SHA256, or MD5), second signature data obtained by encrypting the second hash data by a specified method (e.g., symmetric key cryptography or public key cryptography), or a decryption key used to decrypt encrypted data.

According to various embodiments of the disclosure, the USRP handler 1101 may verify the validity of the applications 601, 603, and 605 requesting execution of a service, based on the data for verifying the validity of the applications 601, 603, and 605 included in the access information of the third server 530.

According to various embodiments of the disclosure, the USRP handler 1101 may identify whether or not the first signature data included in the application-related data stored in the memory 607 matches the second signature data included in the data for verifying the validity of the applications 601, 603, and 605. If the applications 601, 603, and 605 installed in the electronic device 400 include valid applications 601 and 603, the first signature data may match the second signature data. If the application 605 installed in the electronic device 400 is not valid (e.g., if the third application 605 has only the same name as the first application 601, the third application 605 may not be valid), the first signature data may not match the second signature data.

According to various embodiments of the disclosure, in response to identifying that the first signature data matches the second signature data, the USRP handler 1101 may identify that the applications 601 and 603 requesting execution of a service are valid applications. In response to identifying that the first signature data does not match the second signature data, the USRP handler 1101 may identify that the application 605 requesting execution of a service is an invalid application.

According to various embodiments of the disclosure, the USRP handler 1101 may identify whether or not the first hash data included in the application-related data stored in the memory 607 matches the second hash data included in the data for verifying the validity of the applications 601, 603, and 605. If the applications 601, 603, and 605 installed in the electronic device 400 include valid applications 601 and 603, the first hash data may match the second hash data. If the application 605 installed in the electronic device 400 is not valid (e.g., if the third application 605 has only the same name as the first application 601, the third application 605 may not be valid), the first hash data may not match the second hash data.

According to various embodiments of the disclosure, in response to identifying that the applications 601 and 603 are valid, the USRP handler 1101 may perform data transmission/reception using a transmission path included in the USRP information. The USRP handler 1101 may control the communication circuit 611 such that the applications 601 and 603 transmit first data 1103 to the external server 430 using a transmission path included in the USRP information or receive data transmitted from the external server 430 using a transmission path included in the USRP information.

According to various embodiments of the disclosure, in response to identifying that the application 605 is not valid, the USRP handler 1101 may access the external server 430 using a different path, instead of using the transmission path included in the USRP information.

An electronic device according to various embodiments of the disclosure may include: a memory configured to store data related to an application, the application, and/or an edge enabler client (EEC); a communication circuit configured to be used for communication connections between the electronic device and a first server, a second server, and/or a third server, which are located outside the electronic device, through a base station; and a processor, wherein the application may be configured to perform one or more functions corresponding to an application, which is executable in the third server, in the electronic device, and wherein the processor may be configured to receive access information of the third server from the first server and/or the second server, identify, in response to a request for connection of a service using the third server from the application stored in the memory, validity of the application, based on data for verifying the validity of the application included in the access information of the third server and the data related to the application, and access the third server and perform the service, based on a result of identifying the validity of the application.

In the electronic device according to various embodiments of the disclosure, the processor may be configured to compare first signature data included in the data related to the application with second signature data included in the data for verifying the validity of the application, and access the third server and perform the service, based on the comparison result.

In the electronic device according to various embodiments of the disclosure, the processor may be configured to compare first hash data included in the data related to the application with second hash data, and access the third server and perform the service, based on the comparison result, and the second hash data may be data produced by decrypting second signature data included in the data for verifying the validity of the application using a decryption key included in the data for verifying the validity of the application.

In the electronic device according to various embodiments of the disclosure, the processor may be configured to compare first hash data included in the data related to the application with second hash data included in the data for verifying the validity of the application, and access the third server and perform the service, based on the comparison result.

In the electronic device according to various embodiments of the disclosure, the processor may be configured to receive a decryption key from the first server, produce second hash data by decrypting second signature data included in the data for verifying the validity of the application, based on the decryption key, compare first hash data included in the data related to the application with the second hash data, and access the third server and perform the service, based on the comparison result.

In the electronic device according to various embodiments of the disclosure, the processor may be configured to produce second hash data by decrypting first signature data included in the data related to the application, based on a decryption key included in the data for verifying the validity of the application, compare first hash data included in the data related to the application with the second hash data, and access the third server and perform the service, based on the comparison result.

In the electronic device according to various embodiments of the disclosure, the processor may be configured to receive a decryption key from an external server, produce second hash data by decrypting authentication data included in data for verifying the validity of the application, based on the decryption key, compare first hash data included in the data related to the application with the second hash data, and access the third server and perform the service, based on the comparison result.

In the electronic device according to various embodiments of the disclosure, the data for verifying the validity of the application may be configured to be received from the second server.

In the electronic device according to various embodiments of the disclosure, the processor may be configured to perform wireless communication through the third server, based on a result of identifying the validity of the application.

In the electronic device according to various embodiments of the disclosure, the processor may be configured to perform the service through the third server in response to identifying that verification of the validity of the application is successful.

In the electronic device according to various embodiments of the disclosure, the processor may be configured to block data transmission using the application in response to identifying that verification of the validity of the application fails.

Figure 12:
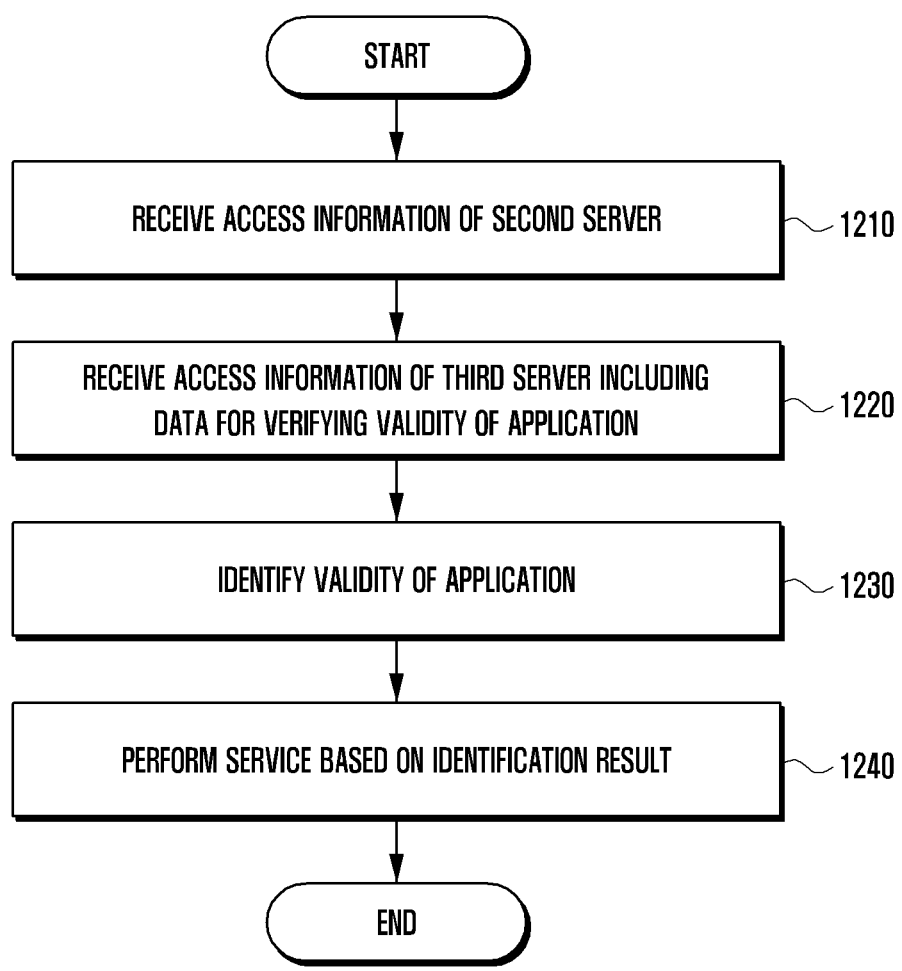
FIG. 12 is a flowchart illustrating an operating method of an electronic device according to an embodiment of the disclosure.

FIG. 12 is a flowchart illustrating an operating method 1200 of an electronic device according to an embodiment of the disclosure.

Referring to FIG. 12, according to various embodiments of the disclosure, in operation 1210, an electronic device (e.g., the electronic device 400 in FIG. 4) may receive access information of at least one second server (e.g., the second server 520 in FIG. 5) from a first server (e.g., the first server 510 in FIG. 5).

According to various embodiments of the disclosure, the access information of the second server 520 may include at least one piece of identification information of the second server 520, IP address information of the second server 520, domain information of the second server 520, or URI information of the second server 520.

According to various embodiments of the disclosure, in operation 1220, the electronic device 400 may receive access information of at least one third server (e.g., the third server 530 in FIG. 5) from at least one second server 520.

According to various embodiments of the disclosure, the EEC 503 may perform an edge service discovery procedure for obtaining information about the third server 530 capable of providing an edge computing service to the application 505. The EEC 503 may transmit, to the second server 520, an edge service discovery request message requesting access information of at least one third server 530 connected to the second server 520. The second server 520 may transmit an edge service discovery response message including access information of the third server 530 stored in the second server 520 to the EEC 503. The access information of the third server 530 may include an identifier of the third server 530 and information for accessing the applications 531 and 533 installed in the third server 530. The information for accessing the applications 531 and 533 installed in the third server 530 may include access address information (e.g., URI information, IP address, and/or domain address) or a service identifier (EAS ID) for accessing a service using the applications 531 and 533.

According to various embodiments of the disclosure, the access information of the third server 530 may include data for verifying the validity of applications. Verifying the validity of the applications 601, 603, and 605 may indicate an operation of identifying whether or not the applications are allowed to perform a service using the third server 530.

According to various embodiments of the disclosure, the data for verifying the validity of applications may indicate data that may be used for verifying the validity of the applications 601, 603, and 605. The data for verifying the validity of applications may include at least one or more of second hash data produced by inputting binary data of the installation data of the applications 601, 603, and 605 into a function implemented by a specified algorithm (e.g., SHA1, SHA256, or MD5), second signature data obtained by encrypting the second hash data in a specified method (e.g., symmetric key cryptography or public key cryptography), a decryption key used to decrypt encrypted data, certificates of the applications 601, 603, and 605, and hash data of the certificates.

According to various embodiments of the disclosure, in operation 1230, the electronic device 400 may identify the validity of the applications, based on the data for verifying the validity of the applications.

According to various embodiments of the disclosure, the electronic device 400 may identify whether or not the first signature data included in the application-related data stored in a memory (e.g., the memory 607 in FIG. 6) matches the second signature data included in the data for verifying the validity of the applications 601, 603, and 605. If the applications 601, 603, and 605 installed in the electronic device 400 include valid applications 601 and 603, the first signature data may match the second signature data. If the application 605 installed in the electronic device 400 is not valid (e.g., if the third application 605 has only the same name as the first application 601, the third application 605 may not be valid), the first signature data may not match the second signature data.

According to various embodiments of the disclosure, in response to identifying that the first signature data matches the second signature data, the electronic device 400 may identify that the applications 601 and 603 requesting execution of a service are valid applications. In response to identifying that the first signature data does not match the second signature data, the electronic device 400 may identify that the application 605 requesting execution of a service is an invalid application.

According to various embodiments of the disclosure, the electronic device 400 may identify whether or not the first hash data included in the application-related data stored in the memory 607 matches the second hash data included in the data for verifying the validity of the applications 601, 603, and 605. If the applications 601, 603, and 605 installed in the electronic device 400 include valid applications 601 and 603, the first hash data may match the second hash data. If the application 605 installed in the electronic device 400 is not valid (e.g., if the third application 605 has only the same name as the first application 601, the third application 605 may not be valid), the first hash data may not match the second hash data.

According to various embodiments of the disclosure, the electronic device 400 may produce the second hash data using the second signature data and the decryption key included in the data for verifying the validity of the applications 601, 603, and 605. The electronic device 400 may identify whether or not the first hash data included in the application-related data stored in the memory 607 matches the second hash data.

According to various embodiments of the disclosure, the electronic device 400 may also receive a decryption key for decrypting the second signature data from the first server 510. The electronic device 400 may produce the second hash data using the second signature data included in the data for verifying the validity of the applications 601, 603, and 605 and the decryption key received from the first server 510. The electronic device 400 may identify whether or not the first hash data included in the application-related data stored in the memory 607 matches the second hash data.

According to various embodiments of the disclosure, the electronic device 400 may decrypt the first signature data included in the data related to the applications 601, 603, and 605 using the decryption key included in the data for verifying the validity of the applications 601, 603, and 605. The electronic device 400 may identify whether or not a decryption value of the first signature data matches the first hash data.

According to various embodiments of the disclosure, in response to identifying that the first hash data matches the second hash data, the electronic device 400 may identify that the applications 601 and 603 requesting execution of a service are valid applications. In response to identifying that the first hash data does not match the second hash data, the electronic device 400 may identify that the application 605 requesting execution of a service is an invalid application.

According to various embodiments of the disclosure, in operation 1240, the electronic device 400 may access the third server 530, based on the result of identifying the validity of the applications 601, 603, and 605, and perform a service.

According to various embodiments of the disclosure, the electronic device 400, in response to identifying that the applications 601 and 603 are valid, may access the third server 530 and perform a service. The electronic device 400 may control communication circuit 611 such that the applications 601 and 603 may transmit data to the third server 530 or receive data transmitted from the third server 530.

According to various embodiments of the disclosure, in response to identifying that the application 605 is not valid, the electronic device 400 may block the operation of accessing the third server 530 to perform a service. The electronic device 400 may control the communication circuit 611 such that the application 605 may transmit data to the external server 430 or receive data transmitted from the external server 430.

An operating method of an electronic device according to various embodiments of the disclosure may include: receiving access information of a second server for accessing the second server from a first server; receiving access information of a third server from the second server accessed based on the access information of the second server; identifying, in response to a request for connection of a service using the third server from an application, validity of the application, based on data for verifying the validity of the application included in the access information of the third server; and accessing the third server to perform the service, based on a result of identifying the validity of the application.

The operating method of an electronic device according to various embodiments of the disclosure may further include: comparing first signature data included in data related to the application, which is stored in a memory of the electronic device, with second signature data included in the data for verifying the validity of the application; and accessing the third server to perform the service, based on the comparison result.

The operating method of an electronic device according to various embodiments of the disclosure may further include: comparing first hash data included in the data related to the application, which is stored in a memory of the electronic device, with second hash data; and accessing the third server to perform the service, based on the comparison result, and the second hash data may be data produced by decrypting second signature data included in the data for verifying the validity of the application using a decryption key included in the data for verifying the validity of the application.

The operating method of an electronic device according to various embodiments of the disclosure may further include: comparing first hash data included in data related to the application, which is stored in a memory of the electronic device, with second hash data included in the data for verifying the validity of the application; and accessing the third server to perform the service, based on the comparison result.

The operating method of an electronic device according to various embodiments of the disclosure may further include: receiving a decryption key from the first server; producing second hash data by decrypting second signature data included in the data for verifying the validity of the application, based on the decryption key; comparing first hash data included in the data related to the application with the second hash data; and accessing the third server to perform the service, based on the comparison result.

The operating method of an electronic device according to various embodiments of the disclosure may further include: producing second hash data by decrypting first signature data included in the data related to the application, based on a decryption key included in the data for verifying the validity of the application; comparing first hash data included in the data related to the application with the second hash data; and accessing the third server to perform the service, based on the comparison result.

The operating method of an electronic device according to various embodiments of the disclosure may further include: receiving a decryption key from an external server; producing second hash data by decrypting authentication data included in data for verifying the validity of the application, based on the decryption key; comparing first hash data included in the data related to the application with the second hash data; and accessing the third server to perform the service, based on the comparison result.

The operating method of an electronic device according to various embodiments of the disclosure may further include: transmitting a signal requesting access information of the third server including a service identifier capable of being provided from the third server; and receiving the access information of the third server including data for verifying the validity of the application corresponding to the service identifier, and the data for verifying the validity of the application may exist in a service identifier (EAS) field or an application identifier (ACID) field of access information of the third server.

The operating method of an electronic device according to various embodiments of the disclosure may further include any one of: performing the service through the third server in response to identifying that verification of the validity of the application is successful; or blocking the performing of the service through the third server in response to identifying that verification of the validity of the application fails.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    memory configured to store a client application, first data for verifying the client application and an edge enabler client (EEC);
    a communication circuit configured to connect to each of an edge configuration server (ECS) an edge enabler server (EES), and an edge application server (EAS), which are located outside the electronic device, through a base station; and
    at least one processor communicatively coupled to the memory and the communication circuit,
    wherein the client application is configured to perform one or more functions in the electronic device, the one or more functions provided by a server application executable in the EAS, and
    wherein the at least one processor is configured to cause the EEC to:
        execute the client application for performing an edge computing service using the server application on the EAS,
        in response to executing the client application, verify the client application using the EEC based at least on the first data,
        when the client application is verified, by the EEC, as a valid application for performing the edge computing service, access the EAS and perform the edge computing service, and
        when the client application is verified, by the EEC, as an invalid application for performing the edge computing service, refrain from accessing the EAS and performing the edge computing service.

2. The electronic device of claim 1, wherein the at least one processor is further configured to:
    transmit, to the ECS, a request for access information of the EES,
    receive, from the ECS, the access information of the EES,
    transmit, to the EES, an edge service discovery request message for requesting access information of the EAS,
    receive, from the EES, an edge service discovery response message, wherein the edge service discovery response message includes second data for verifying the client application, and
    verify the client application using the EEC based on the first data and the second data.

3. The electronic device of claim 2,
    wherein the at least one processor is further configured to:
        compare first hash data included in the first data with second hash data included in the second data, and
        access the EAS and perform the edge computing service, based on a comparison result, and
    wherein the second hash data is data produced by decrypting second signature data included in the second data using a decryption key included in the second data.

4. The electronic device of claim 2, wherein the at least one processor is further configured to:
    compare first hash data included in the first data with second hash data included in the second data, and
    access the EAS and perform the edge computing service, based on a comparison result.

5. The electronic device of claim 2, wherein the at least one processor is further configured to:
    receive a decryption key from the ECS,
    produce second hash data by decrypting second signature data included in the second data, based on the decryption key,
    compare first hash data included in the first data with the second hash data, and
    access the EAS and perform the edge computing service, based on a comparison result.

6. The electronic device of claim 2, wherein the at least one processor is further configured to:
    produce second hash data by decrypting first signature data included in the first data, based on a decryption key included in the second data,
    compare first hash data included in the first data with the second hash data, and
    access the EAS and perform the edge computing service, based on a comparison result.

7. The electronic device of claim 2, wherein the at least one processor is further configured to:
receive a decryption key from an external server,
produce second hash data by decrypting authentication data included in second data, based on the decryption key,
compare first hash data included in the first data with the second hash data, and
access the EAS and perform the edge computing service, based on a comparison result.

8. The electronic device of claim 2, wherein the second data is configured to be received from the EES.

9. The electronic device of claim 2, wherein the at least one processor is further configured to perform wireless communication through the EAS, based on a result of verifying the client application.

10. A method performed by an electronic device, the method comprising:
receiving access information of an edge enabler server (EES) for accessing the EES from an edge configuration server (ECS);
receiving access information of an edge application server (EAS) from the EES accessed based on the access information of the EES;
executing a client application for performing an edge computing service using a server application on an edge application server (EAS);
in response to executing the client application, verifying the client application based at least on first data for verifying the client application; when the client application is verified, by an edge enabler client (EEC) of the electronic device, as a valid application for performing the edge computing service, accessing the EAS to perform the edge computing service; and
when the client application is verified, by the EEC, as an invalid application for performing the edge computing service, refraining from accessing the EAS and performing the edge computing service.

11. The method of claim 10, further comprising:
transmitting, to an edge configuration server (ECS), a request for access information of an edge enabler server (EES);
receiving, from the ECS, the access information of the EES;
transmitting, to the EES, an edge service discovery request message for requesting access information of the EAS;
receiving, from the EES, an edge service discovery response message, wherein the edge service discovery response message includes second data for verifying the client application; and
verifying the client application using the EEC based on the first data and the second data.

12. The method of claim 11, further comprising:
comparing first hash data included in the first data, which is stored in a memory of the electronic device, with second hash data; and
accessing the EAS to perform the edge computing service, based on a comparison result,
wherein the second hash data is data produced by decrypting second signature data included in the second data using a decryption key included in the second data.

13. The method of claim 11, further comprising:
comparing first hash data included in first data, which is stored in a memory of the electronic device, with second hash data included in the second data; and
accessing the EAS to perform the edge computing service, based on a comparison result.

14. The method of claim 11, further comprising:
receiving a decryption key from the ECS;
producing second hash data by decrypting second signature data included in the second data, based on the decryption key;
comparing first hash data included in the first data with the second hash data; and
accessing the EAS and perform the edge computing service, based on a comparison result.

15. The method of claim 11, further comprising:
producing second hash data by decrypting first signature data included in the first data, based on a decryption key included in the second data;
comparing first hash data included in the first data with the second hash data; and
accessing the EAS and perform the edge computing service, based on a comparison result.

16. The method of claim 11, further comprising:
receiving a decryption key from an external server;
producing second hash data by decrypting authentication data included in the second data, based on the decryption key;
comparing first hash data included in the first data with the second hash data; and
accessing the EAS and perform the edge computing service, based on a comparison result.

17. The method of claim 11, wherein data for verifying the client application is configured to be received from the EES.

18. The method of claim 11, further comprising performing wireless communication through the EAS, based on a result of verifying the client application.

* * * * *